US012748437B1

(12) United States Patent
Geng et al.

(10) Patent No.: US 12,748,437 B1
(45) Date of Patent: Sep. 29, 2026

(54) PATH PLANNING METHOD AND CONTROLLER

(71) Applicant: VisionNav Robotics USA Inc., Acworth, GA (US)

(72) Inventors: Yimin Geng, Acworth, GA (US); Lijun Yuan, Acworth, GA (US); Fan Zheng, Acworth, GA (US)

(73) Assignee: VISIONNAV ROBOTICS USA INC., Acworth, GA (US)

( * ) Notice: Subject to any disclaimer, the term of this patent is extended or adjusted under 35 U.S.C. 154(b) by 0 days.

(21) Appl. No.: 19/360,123

(22) Filed: Oct. 16, 2025

(51) Int. Cl.
*G05D 1/644* (2024.01)
*G05D 1/24* (2024.01)
*G05D 1/622* (2024.01)

(52) U.S. Cl.
CPC ............... *G05D 1/644* (2024.01); *G05D 1/24* (2024.01); *G05D 1/622* (2024.01)

(58) Field of Classification Search
CPC ........... G05D 1/644; G05D 1/24; G05D 1/622
See application file for complete search history.

(56) References Cited

U.S. PATENT DOCUMENTS 11,480,968 B1 * 10/2022 Atrash ................. G05D 1/0214
2025/0073897 A1 * 3/2025 Ohnishi .............. B60W 60/001

FOREIGN PATENT DOCUMENTS

CN 107179078 A 9/2017
CN 113919543 A 1/2022
CN 117687366 A 3/2024

OTHER PUBLICATIONS

Teng et al., Motion Planning for Autonomous Driving, May 10, 2024, IEEE, pp. 1-21 (Year: 2024).*
Mohamed Reda et al., Robotics and Autonomous Systems, Jan. 12, 2024, Elsevier, pp. 2-45 (Year: 2024).*

* cited by examiner

*Primary Examiner* — Anne Marie Antonucci
*Assistant Examiner* — Luis G Del Valle

(57) ABSTRACT

The present disclosure relates to a path planning method and a controller. The method includes: receiving a task, and determining one or more first paths based on the task, the first paths being paths on a map of the task; determining an initial occupancy identifier of each of the first paths based on current occupancy identifiers of paths in an operating environment; determining, based on the initial occupancy identifiers, one or more second paths for performing the task and an available occupancy identifier of each of the second paths, wherein each of the current occupancy identifiers, the initial occupancy identifiers, and the available occupancy identifiers includes a natural number or an interval defined by the natural number, and each of these identifiers are used to determine an execution sequence of a corresponding path; and sending the second paths to a RCS.

20 Claims, 13 Drawing Sheets

S100

A: <A, X1, Y1>
B: <B, X2, Y2>
C: <C, X3, Y3>
D: <D, X4, Y4>
E: <E, X5, Y5>
F: <F, X6, Y6>
G: <G, X7, Y7>
H: <H, X8, Y8>
FIG. 2B
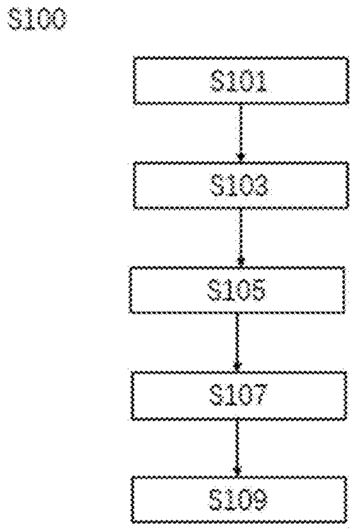
FIG. 3
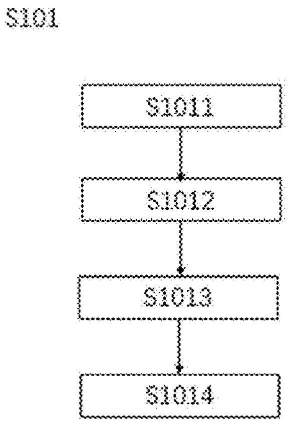
FIG. 4

```
T2
{Task Number: 150
 EXCUTEAGV: 30
 GOODS TYPE:1
          Subtask 1:
        {
           S: 1
           Type: Pickup
           Park: Node B
           roads_map: Map X1
           end_roads_map: Map X1
        }
          Subtask 2:
       {
           S: 2
           Type: Drop-off
           Park: Node H
           roads_map: Map X1
           end_roads_map: Map X1          }

}
```

| First path of T2 | Conflicting path of T2 | Current occupancy identifier of conflicting path | Initial occupancy identifier of first path of T2 |
|---|---|---|---|
| M1 | M1, M2 | [1-1] | [2-∞) |
| M2 | M1, M2 | [1-1] | [2-∞) |
| M3 | M3 | [2-∞) | [1-1] |
| M4 | M4, M5 | [Empty] | [1-∞) |
| M5 | M4, M5 | [Empty] | [1-∞) |
| M6 | M6, M7 | [Empty] | [1-∞) |
| M7 | M6, M7 | [Empty] | [1-∞) |
| M8 | M8, M9 | [Empty] | [1-∞) |
| M9 | M8, M9 | [Empty] | [1-∞) |
| M10 | M10, M11 | [Empty] | [1-∞) |
| M11 | M10, M11 | [Empty] | [1-∞) |
| M12 | M12, M13 | [Empty] | [1-∞) |
| M13 | M12, M13 | [Empty] | [1-∞) |
| M14 | M14, M15 | [Empty] | [1-∞) |
| M15 | M14, M15 | [Empty] | [1-∞) |

FIG. 11A

PATH PLANNING METHOD AND CONTROLLER

FIELD OF THE INVENTION

The present disclosure relates to the fields of warehousing, logistics and manufacturing, and specifically, to a path planning method and a controller.

DESCRIPTION OF THE PRIOR ART

In the fields of warehousing, logistics and manufacturing, during operation of a mobile apparatus, a dispatch system performs path planning and implements traffic management. There is a need in the art for a path planning method with higher efficiency and reliability.

BRIEF DESCRIPTION OF THE DRAWINGS

The accompanying drawings are used to provide further understanding of the present disclosure and constitute a part of the specification, and are used to explain the present disclosure together with the following specific implementations, but are not intended to limit the present disclosure. In the accompanying drawings:

FIG. 2B is a schematic diagram of information of nodes in the operating environment according to the embodiment shown in FIG. 2A.

FIG. 3 is a flowchart of a path planning method according to some embodiments of the present disclosure.

FIG. 4 is a detailed flowchart of operation S101 in the path planning method according to the embodiment shown in FIG. 3.

FIG. 11A, FIG. 11B, FIG. 11C, FIG. 11D, FIG. 11E, FIG. 11F, and FIG. 11G are detailed schematic flowcharts of a path planning method according to some embodiments of the present disclosure, a path planning method for the task shown in FIG. 10.

DETAILED DESCRIPTION

Figure 1:
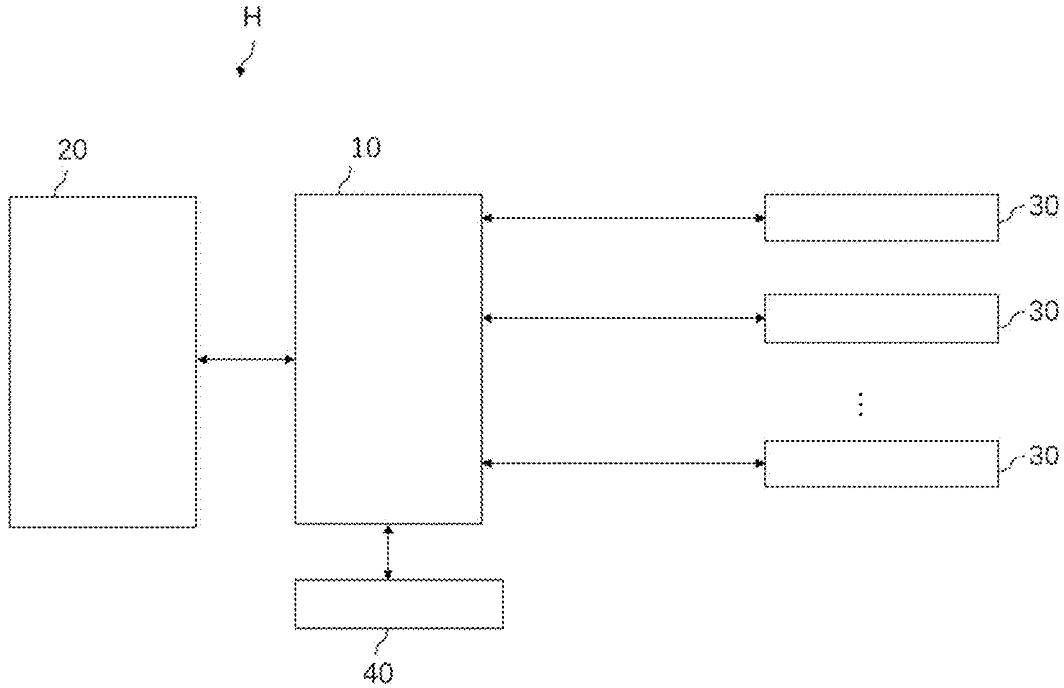
FIG. 1 is a schematic diagram of an overall system according to some embodiments of the present disclosure.

The following description in conjunction with the accompanying drawings is provided to facilitate understanding of the present disclosure. The following discussion will focus on specific implementations and embodiments of the present disclosure. This focus is intended to aid in the description of the teachings, and should not be interpreted as a limitation on the scope or applicability of the teachings. However, other embodiments may be used based on the teachings disclosed in the present disclosure.

The terms "include/comprise", "have", and any variations thereof in the present disclosure are intended to cover a non-exclusive inclusion. For example, a process, method, system, apparatus, product, or device that comprises a series of actions or elements is not necessarily limited to those expressly listed steps or elements, but may include other actions or elements not expressly listed or inherent to such a process, method, system, apparatus, product, or device.

In addition, unless otherwise explicitly stated, "or" refers to an inclusive "or" rather than an exclusive "or". For example, a condition A or B may be satisfied by any one of the following: A is true (or present) and B is false (or not present), A is false (or not present) and B is true (or present), and both A and B are true (or present).

The following disclosure provides various implementations or examples, which can be used to implement different features of the present disclosure. The following specific examples of components and configurations are used to simplify the present disclosure. It is to be understood that these descriptions are merely illustrative and are not intended to limit the present disclosure. For example, in the following descriptions, "first", "second", and the like are used to distinguish different objects rather than describe a specific order of the objects. For example, without departing from the scope of the present disclosure, a first parameter may be referred to as a second parameter, and similarly, a second parameter may be referred to as a first parameter. In addition, in the present disclosure, like component numerals and/or symbols may be reused across multiple embodiments. The repeated use is based on an objective of brevity and clarity, and does not represent a relationship between the different embodiments and/or configurations discussed.

Although numerical ranges and parameters set forth herein to define the broad scope of the present disclosure are approximations, relevant values in specific embodiments have been presented as precisely as possible herein. However, any value essentially inevitably includes a standard deviation caused by an individual test method. Herein, "about" generally means that an actual value is within plus or minus 10%, 5%, 1%, or 0.5% of a particular value or range. Alternatively, the word "about" represents that the actual value falls within an acceptable standard error of an average value, and is determined according to consideration of a person of ordinary skill in the art to which the present disclosure belongs. It may be understood that, except experimental examples, or unless otherwise clearly stated, all ranges, quantities, values, and percentages used herein (for example, to describe an amount of a material, a time length, a temperature, an operating condition, a quantity ratio, and the like) are modified by "about". Therefore, unless otherwise specified to the contrary, numerical parameters disclosed in the specification and the appended claims are approximate values, and may be changed according to requirements. These numerical parameters should be understood as at least an indicated quantity of significant digits and values obtained by applying a general rounding rule. Herein, numerical ranges are represented as from one endpoint to the other endpoint or between the two endpoints. Unless otherwise specified, all the numerical ranges herein include the endpoints.

With the popularization of intelligent warehousing and logistics, various mobile apparatuses have been widely introduced into industries such as the warehousing industry, the logistics industry, and the manufacturing industry, to improve production efficiency and operational effectiveness. Generally, a dispatch system is used to perform path planning and real-time traffic management on a plurality of mobile apparatuses. Due to factors such as fluctuations in a travel speed of the mobile apparatus and complex interaction relationships in human-machine collaborative operation scenarios, the dispatch system needs to possess greater robustness and flexibility in controlling the mobile apparatuses and also needs to stably avoid a deadlock risk. These factors increase the difficulty in controlling the speed of the mobile apparatus but also increases the coordination complexity of human-machine collaboration and places higher demands on the timeliness and accuracy of demand responses.

The inventors have recognized that, for an absolute time-based global roaming multi-vehicle dispatch mechanism, a time at which a mobile apparatus reaches each node during task execution is calculated by using a travel speed of the mobile apparatus, and another mobile apparatus is prohibited from occupying a same path or node within a same time, to prevent collisions of the mobile apparatuses in a same spatiotemporal region, thereby preventing a deadlock in advance. However, an actual operating speed of the mobile apparatus is affected by multiple complex factors, and cannot achieve the precision in a simulation environment. Therefore, the mechanism has limitations, and is difficult to apply to practical industrial scenarios.

On the other hand, the inventors have recognized, for a multi-vehicle dispatch mechanism based on a local control path algorithm, encounters between different mobile apparatuses are minimized by using rigorously designed on-site paths and task flows, thereby effectively preventing deadlocks. However, since a path conflict that may occur in the future cannot be predicted in advance, a deadlock easily occurs, thereby reducing production efficiency.

Therefore, there is a need for a path planning method that can overcome the aforementioned limitations.

FIG. 1 is a schematic diagram of an overall system H according to some embodiments of the present disclosure. As shown in FIG. 1, the overall system H may include: a robot control system (RCS) 10, a dispatch system 20, one or more mobile apparatuses 30, and an external service system 40.

The RCS 10 may be configured to receive order data from the external service system 40, generate a task based on the order data, and send the task to the dispatch system 20. In some embodiments, the RCS 10 may receive the order data from the external service system 40 by using a preset data interface. In some embodiments, the RCS 10 may be configured to receive feedback information from the mobile apparatus 30. The feedback information may include, for example, but not limited to, a state of the mobile apparatus 30 (for example, but not limited to, a position and/or surrounding obstacles of the mobile apparatus 30), goods information of goods carried by the mobile apparatus 30, and/or task execution information. In some embodiments, the RCS 10 may be configured to send the feedback information of the mobile apparatus 30 to the dispatch system 20.

The external service system 40, which interacts with the RCS 10, may be an external service source or a data provider that provides related order data or instructions. In some embodiments, the external service system 40 is, for example, but not limited to, a warehouse management system (WMS). In some embodiments, the external service system 40 may be configured to send the order data to the RCS 10.

The dispatch system 20 may be configured to receive data from the RCS 10, and manage and coordinate operation of the one or more mobile apparatuses 30. The data may be, for example, but not limited to, a task and/or feedback information. In some embodiments, the dispatch system 20 may be integrated with the RCS 10 as a module of the RCS 10. In some embodiments, the dispatch system 20 and the RCS 10 may be independent of each other. The dispatch system 20 may be configured to provide algorithmic support for the RCS 10. In some embodiments, the dispatch system 20 may assist the RCS 10 with tasks such as task allocation and path planning. In some embodiments, the dispatch system 20 is responsible for tasks such as task allocation, path planning, and traffic management. In some embodiments, the dispatch system 20 is configured to include a hardware part and a software part. The hardware part includes, for example, but not limited to, a controller. In some embodiments, the hardware part of the dispatch system 20 includes, for example, but not limited to, a controller, a communication module, a sensor, and the like. In some embodiments, the software part of the dispatch system 20 includes, for example, but not limited to, a path planning algorithm module, a task allocation algorithm module, a monitoring and management module, and the like. In some embodiments, the controller of the dispatch system 20 generally includes parts such as a processor, a memory, an input/output interface, a motherboard, and peripheral circuits and elements at a hardware level. In some embodiments, the controller of the dispatch system 20 generally includes parts such as a control algorithm, an operating system, and a communication protocol at a software level. The controller herein may refer to a controller set configured to perform the same task or different tasks. The dispatch system 20 may dispatch, for example, but not limited to, mobile apparatuses such as a mobile robot, an autonomous mobile device, an unmanned aerial vehicle, a material handling device, and an automated guided forklift. The mobile robot may include, for example, but not limited to, an automated guided vehicle (AGV), an autonomous mobile robot (AMR), a humanoid robot, a floor washing robot, a floor sweeping robot, an agricultural robot, an inspection robot, and the like. The autonomous mobile device may include, for example, but not limited to, a smart car and a smart electric vehicle. In some embodiments, the dispatch system 20 may dispatch any intelligent mobile apparatus.

In some embodiments, the dispatch system 20 may be configured to receive a task from the RCS 10. In some embodiments, the dispatch system 20 may be configured to determine information of each subtask based on the task. Task information may include at least one of the following: a number of the mobile apparatus 30 performing the task, goods information of goods carried by the mobile apparatus 30 performing the task, a task end point of the task, and a sequence number S of each subtask of the task ($S \geq 1$, and is a positive integer), a target node of each subtask, and a sub-map involved in each subtask. The goods information may include the length and the width of the goods.

In some embodiments, the dispatch system 20 may be configured to plan a path and an occupancy identifier of the path for the mobile apparatus 30 performing the task. The path may be a complete travel route from a task start point to a task end point that is planned for the mobile apparatus 30 to complete the task thereof. The path may include one or more paths. The dispatch system 20 may be configured to send task-related planning information to the RCS 10. The planning information may include the path and the occupancy identifier of the path.

In the present disclosure, the occupancy identifier may be used to determine an execution sequence of the corresponding path, and may include a natural number, an interval defined by the natural number, an identifier "[empty]" indicating that the path is not occupied by any task, or a combination of a natural number and "∞" (for example, "∞" is used as an end identifier of the interval, and is used to indicate continuity of a path occupancy range).

In some embodiments, the occupancy identifier may be stored as structured data supporting interval subtraction and intersection operations. The structured data may be represented as: [start occupancy identifier-end occupancy identifier], where "[" may be replaced with "(", and "]" may be replaced with ")", where "[" and "]" indicate that a set includes corresponding endpoints, and "(" and ")" indicate that the set does not include the corresponding endpoints. For example, if a current occupancy identifier of a path is [1-2], 1 represents a start identifier (included in the occupancy range), and 2 represents an end identifier (included in the occupancy range), indicating that the path is occupied within an execution sequence interval corresponding to the occupancy identifiers "1" and "2". In some embodiments, a value of the occupancy identifier follows the following logic: when the occupancy identifier is the natural number, a smaller value of the natural number indicates an earlier execution sequence of the corresponding path; and when the occupancy identifier is the interval, a smaller value of a start point of the interval indicates an earlier execution sequence of the corresponding path.

The occupancy identifiers as referred to hereinafter are uniformly calculated by following the rule of "start from 1, and sequentially increase at an interval of 1 occupancy identifier". That is, an indexing scheme of the occupancy identifier uses 1 as a minimum scale. In some embodiments, the minimum scale of the calculation axis may alternatively be set to another appropriate value, which is, for example, but not limited to, 5 or 10, to adapt to scenarios with different path density (for example, a smaller scale is used when path nodes are dense, and a larger scale is used when the nodes are sparse).

In some embodiments, the dispatch system 20 calculates the path by using, for example, but not limited to, a Rapidly-exploring Random Tree (RRT) algorithm and variants thereof, a real-time obstacle avoidance algorithm based on sensor information, a dynamic window approach, an artificial potential field method, a spatio-temporal A* algorithm, an improved A* algorithm, a Dijkstra's algorithm, a genetic algorithm, an ant colony algorithm, a particle swarm optimization (PSO) algorithm, a visibility graph method, a tangent graph method, a breadth-first search (BFS) algorithm, or a depth-first search (DFS) algorithm. In some embodiments, the dispatch system 20 calculates the path and the occupancy identifier by using, for example, but not limited to, the spatio-temporal A* algorithm, the improved A* algorithm, or the Dijkstra's algorithm. In some embodiments, the dispatch system 20 calculates the occupancy identifier of the path by using, for example, but not limited to, the genetic algorithm.

In some embodiments, the dispatch system 20 may be configured to receive feedback information from the RCS 10, and calculate, based on the feedback information, a control path used for the mobile apparatus 30 to travel, to implement traffic management over the mobile apparatus 30. In some embodiments, the dispatch system 20 is configured to send the control path to the RCS 10.

The mobile apparatus 30 may perform the task under management of the dispatch system 20. The task may include, for example, but not limited to, material handling, goods delivery, automated vehicle driving, and the like. In some embodiments, the mobile apparatus 30 may perform the task autonomously. In some embodiments, the mobile apparatus 30 is configured to include a hardware part and a software part. The hardware part includes, for example, but not limited to, a controller. In some embodiments, the hardware part of the mobile apparatus 30 includes, for example, but not limited to, a controller, a communication module, a sensor, and the like. The software part of the mobile apparatus 30 includes, for example, but not limited to, a path planning algorithm module, a monitoring and management module, and the like. In some embodiments, the controller of the mobile apparatus 30 generally includes parts such as a processor, a memory, an input/output interface, a motherboard, and peripheral circuits and elements at a hardware level. In some embodiments, the controller of the mobile apparatus 30 generally includes parts such as a control algorithm, an operating system, and a communication protocol at a software level. The controller herein may refer to a controller set configured to perform the same task or different tasks.

The mobile apparatus 30 may be, for example, but not limited to, a mobile apparatus such as a mobile robot, an autonomous mobile device, an unmanned aerial vehicle, a material handling device, or an automated guided forklift. The mobile robot may include, for example, but not limited to, an AGV, AMR, a humanoid robot, a floor washing robot, a floor sweeping robot, an agricultural robot, an inspection robot, and the like. The autonomous mobile device may include, for example, but not limited to, a smart car and a smart electric vehicle. In some embodiments, the mobile apparatus 30 may be any intelligent mobile apparatus. One or more mobile apparatuses 30 perform the task in a same operating environment. The mobile apparatus 30 may be configured to communicate with the RCS 10. In some embodiments, the mobile apparatus 30 may be configured to be provided with a sensor to detect the operating environment. In some embodiments, the sensor of the mobile apparatus 30 may be configured to detect an abnormal condition in the operating environment that affects normal operation of the mobile apparatus, such as an obstacle appearing in the operating environment, deviation from its intended path, electromagnetic interference, a terrain change, water accumulation or snow accumulation caused by severe weather, or the like. In some embodiments, the sensor is, for example, but not limited to, a Lidar, a visual sensor, an inertial navigation sensor, an ultrasonic sensor, an infrared sensor, a laser obstacle avoidance sensor, a photoelectric sensor, or the like.

Figure 2A:
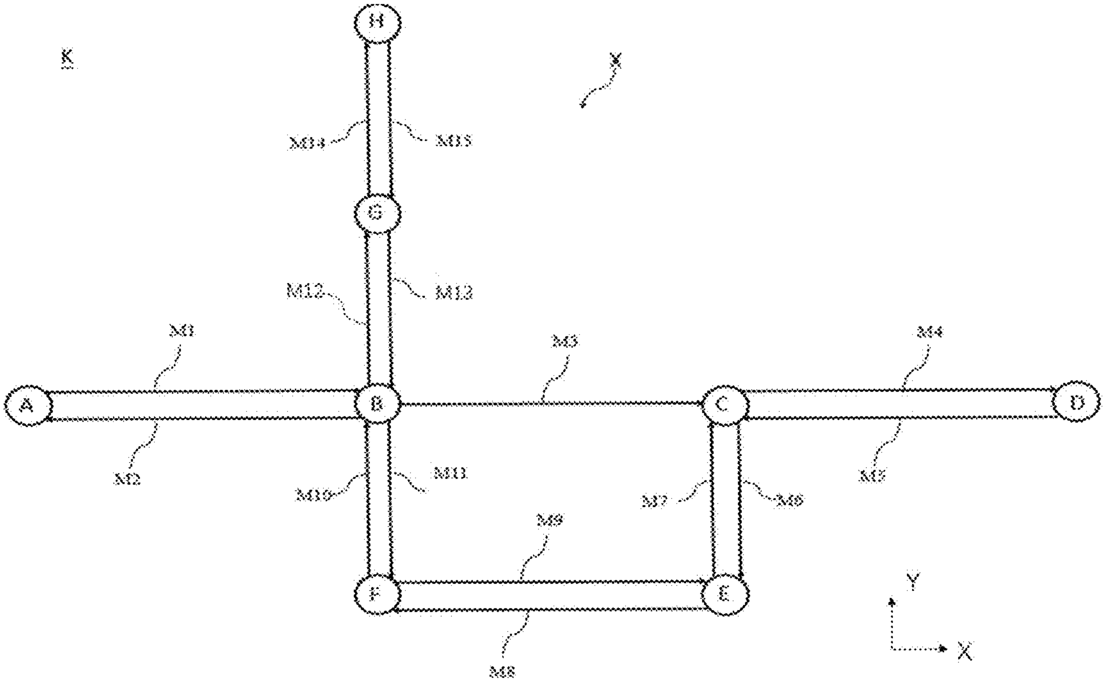
FIG. 2A is a schematic diagram of an operating environment according to some embodiments of the present disclosure.

FIG. 2A is a schematic diagram of an operating environment K according to some embodiments of the present disclosure, which is presented in the form of a map X. FIG.

2B is a schematic diagram of information of nodes in the operating environment K according to the embodiment shown in FIG. 2A.

The map X may be considered as an abstract digital representation of the operating environment K of the mobile apparatus, and may be presented in the form of a topological graph. The map X may be presented in a two-dimensional form. In some embodiments, the map X may be presented in a three-dimensional form. The operating environment K of the mobile apparatus may be, for example, but not limited to, a warehouse, a workshop, a logistics distribution center, a port terminal, an airport goods area, an e-commerce sorting center, an automated storage and retrieval system, areas around a factory production line, a hospital logistics channel, and the like. The map X may include nodes and directed line segments connecting the nodes. The nodes may correspond to functional points in an actual scenario, for example, but not limited to, a goods loading/unloading point, a goods storage location, a warehouse entrance/exit, a material staging area in a workshop, a dock berthing zone, a charging point for the mobile apparatus, a material loading/unloading station on a production line, and the like. The directed line segments each may correspond to a path that the mobile apparatus may travel from one node to another node. The map X may have a corresponding map file. The map file may be stored in the configuration file in a data form. It should be noted that the configuration file may be built in software of the dispatch system 20, and can output a corresponding map file according to different input information. In some embodiments, information of nodes in the operating environment and paths between the nodes may be collected, and the collected information is inputted into the configuration file as input information.

As shown in FIG. 2A, the map X may include nodes A, B, C, D, E, F, G, and H, and paths M1, M2, M3, M4, M5, M6, M7, M8, M9, M10, M11, M12, M13, M14, and M15. The nodes A, B, C, D, E, F, G, and H are goods loading/unloading points in the operating environment K. In some embodiments, a quantity of nodes in the operating environment K, a distribution manner, and types and positions of the nodes may be set according to a configuration and a requirement of a job site. In some embodiments, information of each of the nodes A to H may be represented by using a node number, an X coordinate, and a Y coordinate. The X coordinate and the Y coordinate respectively represent a position thereof in the X direction and a position thereof in the Y direction in the operating environment K. As shown in FIG. 2B, information of the nodes A to H may be respectively represented as <A, X1, Y1>, <B, X2, Y2>, <C, X3, Y3>, <D, X4, Y4>, <E, X5, Y5>, <F, X6, Y6>, <G, X7, Y7>, and <H, X8, Y8>. In some embodiments, two paths in opposite directions are included between any two of the nodes. In some embodiments, paths of any quantity and in any direction may be included between any two of the nodes according to a configuration and a requirement of the job site. In the example in FIG. 2A, the paths M1 to M15 form an interconnected channel network distributed among the nodes A to H and allowing the mobile apparatus to travel thereon, to provide travel routes for material transportation, device movement, or the like. In some embodiments, any one of the paths M1 to M15 is a workshop passage, a warehouse aisle, or the like. Although the paths in the accompanying drawings of the present disclosure are represented in the form of directed line segments, it may be understood that each of the paths M1 to M15 actually has a certain width, and the paths in the accompanying drawings are merely for ease of illustration. A conflict relationship may exist between any two of the paths M1 to M15. A conflict relationship existing between the paths may be understood as that, if two mobile apparatuses experience contour interference when the two mobile apparatuses travel on respective paths, a conflict relationship exists between the two paths.

Figure 5:
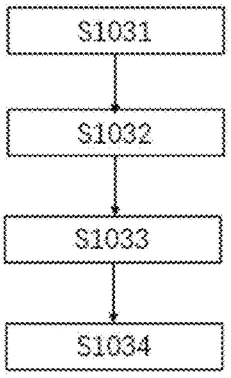
FIG. 5 is a detailed flowchart of operation S103 in the path planning method according to the embodiment shown in FIG. 3.
Figure 6:
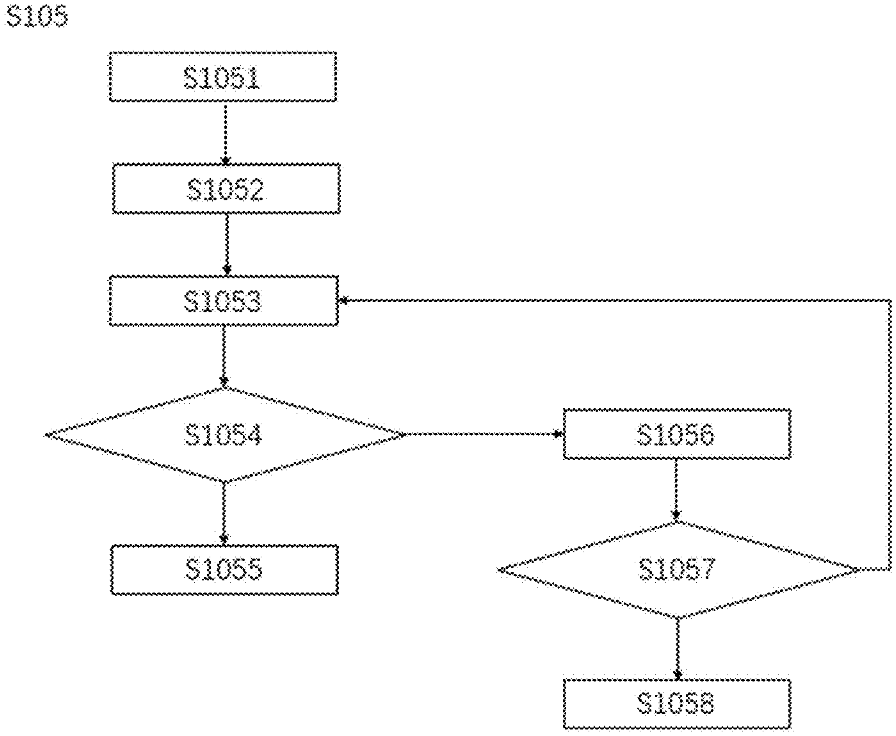
FIG. 6 is a detailed flowchart of operation S105 in the path planning method according to the embodiment shown in FIG. 3.
Figure 7:
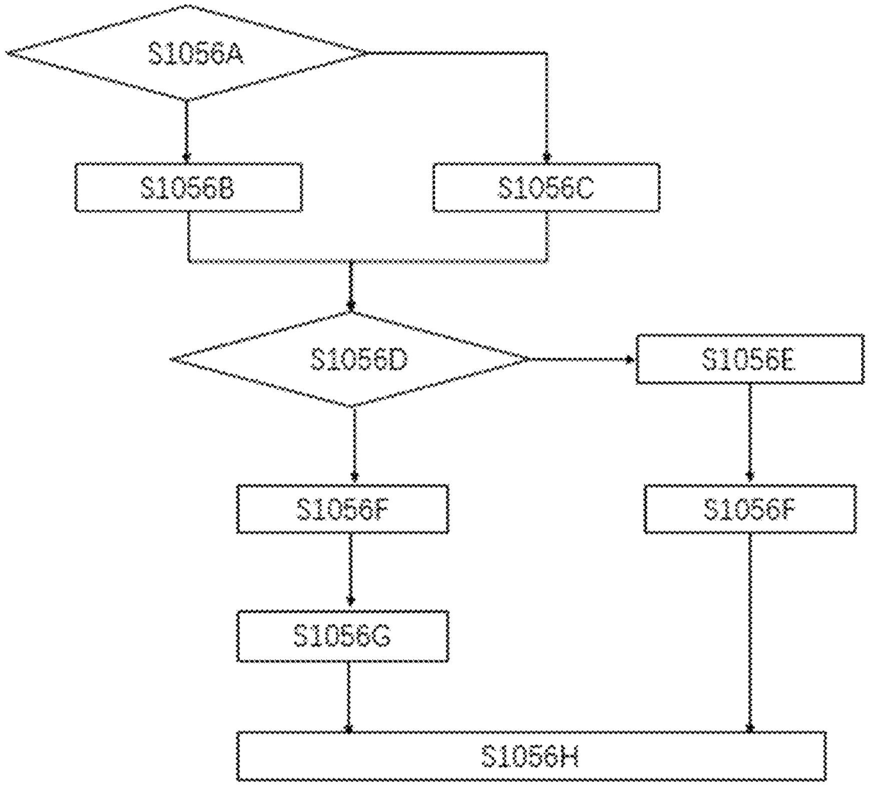
FIG. 7 is a detailed flowchart of operation S1056 in the path planning method according to the embodiment shown in FIG. 6.
Figure 8:
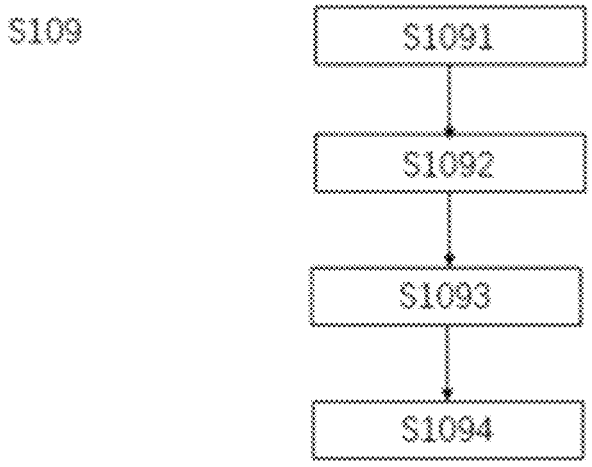
FIG. 8 is a detailed flowchart of operation S109 in the path planning method according to the embodiment shown in FIG. 3.
Figures 9, 10:
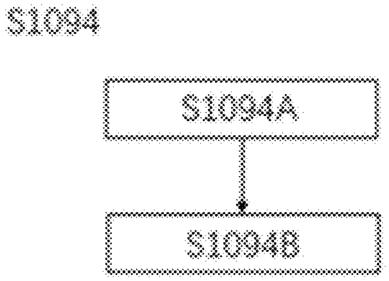
FIG. 9 is a detailed flowchart of operation S1094 in the path planning method according to the embodiment shown in FIG. 8.
FIG. 10 is a schematic diagram of a task according to some embodiments of the present disclosure.

FIG. 3 is a flowchart of a path planning method S100 according to some embodiments of the present disclosure. FIG. 4 is a detailed flowchart of operation S101 in the path planning method S100 according to the embodiment shown in FIG. 3. FIG. 5 is a detailed flowchart of operation S103 in the path planning method S100 according to the embodiment shown in FIG. 3. FIG. 6 is a detailed flowchart of operation S105 in the path planning method S100 according to the embodiment shown in FIG. 3. FIG. 7 is a detailed flowchart of operation S1056 in the path planning method S100 according to the embodiment shown in FIG. 6. FIG. 8 is a detailed flowchart of operation S109 in the path planning method S100 according to the embodiment shown in FIG. 3. FIG. 9 is a detailed flowchart of operation S1094 in the path planning method S100 according to the embodiment shown in FIG. 8. It should be noted that the present disclosure is not limited to strictly following the operational sequence shown in FIG. 3 to FIG. 9, provided that substantially the same result can be obtained. A path planning method S100 may be used to dispatch, for example, but not limited to, any intelligent mobile apparatus such as a mobile robot, an autonomous mobile device, an unmanned aerial vehicle, a material handling device, or an automated guided forklift. The mobile robot may include, for example, but not limited to, an AGV, AMR, a humanoid robot, a floor washing robot, a floor sweeping robot, an agricultural robot, an inspection robot, and the like. The autonomous mobile device may include, for example, but not limited to, a smart car and a smart electric vehicle. In some embodiments, operations of the path planning method S100 may be performed by different control units/processing units or a same control unit/processing unit in the controller. In some embodiments, the path planning method S100 may include operation S101, operation S103, operation S105, operation S107, and/or step 109. In some embodiments, the foregoing operations in the path planning method S100 may be performed by the dispatch system 20.

As shown in FIG. 3, the path planning method S100 commences with operation S101.

In operation S101, the dispatch system 20 may be configured to receive a task. In some embodiments, the dispatch system 20 may be configured to receive the task from the RCS 10. In some embodiments, the dispatch system 20 may be configured to determine that the task includes one or more subtasks.

In operation S101, the dispatch system 20 may determine one or more first paths based on the task.

The first paths may be paths on a map of the task. That is, the first paths may be all paths within a map range corresponding to the task. During path planning, the specific paths to be used by the mobile apparatus cannot be predetermined in advance. Therefore, all paths on the map associated with the task are designated as the one or more first paths. During the path planning, one or more paths may be selected from the one or more first paths as paths for the mobile apparatus to perform the task. In other words, the first paths may be considered as alternative paths to paths for actually performing the task. Specifically, the dispatch system 20 may determine all paths involved by each subtask of the task on the map as the first paths. If the task includes only one subtask, paths on the map associated with the one subtask may be determined as the first paths. If the task includes two or more subtasks, paths on the map associated with each subtask may be determined as the first paths.

As shown in FIG. 4, in some embodiments, "the dispatch system 20 may be configured to determine one or more first paths based on the task" may further include: operation S1011, operation S1012, operation S1013, and/or operation S1014.

In operation S1011, information of each subtask is determined based on the task. In some embodiments, the dispatch system 20 may be configured to decode the task to determine the information of each subtask. In some embodiments, said determining information of each subtask may include determining a sequence number S of the subtask, where the sequence number S is a positive integer equal to or greater than 1. In some embodiments, a smaller value of the sequence number S indicates an earlier execution sequence of the subtask. In some embodiments, a larger value of the sequence number S indicates an earlier execution sequence of the subtask. In some embodiments, said determining information of each subtask may include determining a target node of each subtask. The target node may be a subtask end point of the subtask. The target node may be, for example, but not limited to, a pickup position, a drop-off position, or a scanning position. In some embodiments, said determining information of each subtask may include determining an execution action of the subtask. The execution action may include pickup or drop-off. In some embodiments, said determining information of each subtask may include determining a map involved in each subtask. In some embodiments, the dispatch system 20 may be configured to decode the task to determine target information of the task. The task information may include a number of the task, a number of a mobile apparatus performing the task, a type of the mobile apparatus, goods information of goods carried by the mobile apparatus, information of subtasks, and/or a task end point. The goods information may include the length and the width of the goods. The goods information may further include the height of the goods. The goods information may further include a number, a name, and/or a goods type of the goods. In some embodiments, the dispatch system 20 may be configured to filter out, based on the task information of the task, maps irrelevant to the task and retain only maps relevant to the task to determine the first paths.

In operation S1012, the dispatch system 20 may be configured to add the target node of each subtask to a mandatory node set. In some embodiments, the mandatory node set may be stored in a local storage module of the dispatch system 20, or synchronized to a shared database of the RCS 10 by using a network, so as to be quickly invoked during subsequent path planning.

In operation S1013, the dispatch system 20 may be configured to configure an index value INDEX_1n for each target node based on an execution sequence of the task (for example, when a smaller value of the sequence number S represents an earlier execution sequence of the subtask, configure the index value INDEX_1n for each target node in ascending order of sequence numbers S), to ensure that a travel sequence of the target nodes in a planned path is consistent with a set execution sequence of the target nodes of the task, so that an operation order of the mobile apparatus conforms to a task flow. For the index value INDEX_1n of the target node, n represents the sequence number S of the subtask, and the index value INDEX_1n=S. For example, an index value of a first target node is $INDEX\_1_1=1$, and an index value of a second target node is INDEX $1_2=2$.

In operation S1014, the dispatch system 20 may be configured to configure an index value N for each first path. In some embodiments, an initial value of the index value N may be 0 or a positive integer, and each time one target node is passed, the index value N may be increased by 1. In some embodiments, it may be set that an initial value of the index value N configured for each first path is equal to the index value of the first target node, and each time one target node is passed, an index value N of the first path that has not been calculated is set to an index value INDEX_1n of a next target node. For example, after the first target node is passed, the index value N of the first path that has not been calculated is set to the index value of the second target node; after a third target node is passed, the index value N of the first path that has not been calculated is set to an index value of the third target node, and so on.

FIG. 10 is a schematic diagram of a task T2 according to some embodiments of the present disclosure. It should be noted that the embodiment in FIG. 10 is executed in the operating environment K shown in FIG. 2A. It should be noted that all examples in the present disclosure are merely examples and are not intended to limit the present disclosure. Operation 101 is now described with reference to FIG. 10.

The dispatch system 20 is configured to receive the task T2 from the RCS, and is configured to determine that the task T2 includes a first subtask and a second subtask. Before receiving the task T2, the dispatch system 20 is configured to plan second paths M1 and M3 for a task T1, where an available occupancy identifier of M1 is [1-1], and an available occupancy identifier of M3 is [2-∞).

As shown in FIG. 10, an operation that the dispatch system 20 is configured to determine first paths based on the task T2 may include: determining that a task number of T2 is 150; determining that a number of a mobile apparatus configured to perform the task T2 is 30; determining that a sequence number of the first subtask of T2 is S=1; determining that an execution action of the first subtask is pickup; determining that a target node of the first subtask is a node B; determining a map X1 required for pickup; determining that a sequence number of the second subtask of T2 is S=2; determining that an execution action of the second subtask is drop-off; determining a target node of the second subtask is a node H; and determining the map X1 required for drop-off. The dispatch system 20 may be configured to filter out maps irrelevant to T2 after determining that a map involved in subtasks of the task T2 is the map X1, and determine paths M0 to M15 on the map X1 as first paths of T2.

The dispatch system 20 may be configured to add the target node B of the first subtask and the target node H of the second subtask to a mandatory node set.

The dispatch system 20 is configured to first configure, according to an execution sequence of the task, an index value $INDEX\_1_1=1$ for the target node B of the first subtask. Then, an index value $INDEX\_1_2=2$ is configured for the target node H of the second subtask.

The dispatch system 20 is configured to configure initial values of the index values N for the first paths M1 to M15, where the initial values of the index values N of the first paths M1 to M15 are all 0.

Referring back to FIG. 3, in operation S103, the dispatch system 20 may be configured to determine an initial occupancy identifier of each first path based on current occupancy identifiers of paths in the operating environment K.

The current occupancy identifiers may be considered as occupancy identifiers of all paths in the operating environment K in a current state. The current occupancy identifiers each may be an occupancy identifier of a planned path, which may include an occupancy identifier of a path that has been planned and is to be executed or that has been planned and is being executed; or an unplanned occupancy identifier, for example, "[empty]".

The initial occupancy identifier may be considered as an occupancy identifier that is specific to a path of a current to-be-planned task, is preliminarily allocated by the dispatch system based on the current occupancy identifiers of all the paths in the operating environment K, and is used to represent all execution sequences that the path is expected to use.

As shown in FIG. 5, in some embodiments, operation S103 may further include: operation S1031, operation S1032, operation S1033, and/or operation S1034.

In operation S1031, the dispatch system 20 may be configured to acquire the current occupancy identifiers of all the paths in the operating environment K. In some embodiments, the dispatch system 20 may acquire the current occupancy identifiers of all the paths in the operating environment K in real time, to subsequently determine the initial occupancy identifier of each first path. In some embodiments, the dispatch system 20 may store the current occupancy identifiers as static data, so that data of the current occupancy identifiers used during planning remains unchanged.

In operation S1032, the dispatch system 20 may be configured to determine a global occupancy identifier [1-∞) of each first path. In some embodiments, the global occupancy identifier may be [0-∞).

In operation S1033, the dispatch system 20 may be configured to determine a path spatially conflicting with the first path.

The path spatially conflicting with the first path in the operating environment may be determined by using geometric intersection detection and grid partitioning. In some embodiments, the path spatially conflicting with the first path may be retrieved by using a conflict set. The conflict set is a pre-constructed path conflict retrieval pool, which may be used to quickly determine a path conflict relationship only by directly retrieving path segments spatially overlapping with the first path from the conflict set without performing spatial overlap detection on all paths in the operating environment again when the path spatially conflicting with the first path is determined, thereby reducing repeated calculation overheads. Specifically, all potentially conflicting paths in the map may be added to the conflict set in advance, and are stored as backup data in the dispatch system 20. Subsequently, when the path spatially conflicting with the first path is determined, a number of the path may be inputted into the conflict set, and a path conflicting with the path is retrieved from the conflict set.

In operation S1034, the dispatch system 20 may be configured to exclude, from the global occupancy identifier of each first path, a current occupancy identifier of a conflicting path conflicting with the corresponding first path, to determine the initial occupancy identifier of each first path.

Operation S103 is now described with reference to FIG. 11A. FIG. 11A is a detailed schematic flowchart of a path planning method according to some embodiments of the present disclosure, a path planning method for the task T2 shown in FIG. 10.

After the dispatch system 20 receives the task T2 from the RCS, the dispatch system 20 may be configured to acquire current occupancy identifiers of all the paths M1 to M15 in the operating environment K. Current occupancy identifiers of the paths M1 and M3 planned for the task T1 are respectively [1-1] and [2-∞). It should be noted herein that it is assumed that a conflict relationship exists between the paths M2 and M1. Therefore, although the path M2 is not used by T1, the current occupancy identifier of the path M2 is the same as that of M1, which is [1-1]. The current occupancy identifier of each of M4 to M15 is [empty].

The dispatch system 20 may be configured to determine a global occupancy identifier [1-∞) of each of the first paths M1 to M15.

The dispatch system 20 may be configured to determine a path spatially conflicting with each of the first paths M1 to M15. A number of the path may be inputted, and a conflicting path conflicting with each of the first paths M1 to M15 is retrieved from the conflict set. For example, a number "M1" of the path M1 is inputted, path segments spatially overlapping with the path M1 are retrieved, and retrieval results are: M1 and M2. Next, numbers of the remaining first paths are inputted into the conflict set, and a path segment spatially overlapping with each first path is retrieved. All retrieved paths spatially conflicting with each of the first paths M1 to M15 of T2 are marked as conflicting paths.

Then, for each of the first paths M1 to M15, a current occupancy identifier of a conflicting path is excluded from the global occupancy identifier [1-∞) thereof. For either of the first paths M1 and M2 of T2, a current occupancy identifier [1-1] of a conflicting path is excluded from the global occupancy identifier [1-∞) thereto, to obtain initial occupancy identifiers [2-∞) of the first paths M1 and M2 of T2. For the first path M3 of T2, a current occupancy identifier [2-∞) of a conflicting path is excluded from the global occupancy identifier [1-∞) thereof, to obtain an initial occupancy identifier [1, 1] of the first path M3 of T2. In addition, for each of the first paths M4 to M15 of T2, a current occupancy identifier [empty] of a conflicting path is excluded from the global occupancy identifier [1-∞) thereof, to obtain an initial occupancy identifier [1-∞) of each of the first paths M4 to M15 of T2.

Referring back to FIG. 3, in operation S105, the dispatch system 20 may be configured to determine, based on the initial occupancy identifiers, one or more second paths for performing the task and an available occupancy identifier of each second path. The second path may be a path actually delivered to the mobile apparatus 30. The available occupancy identifier may be considered as an occupancy identifier that is determined by the dispatch system 20 and may be allocated to the second path.

Operation S105 may include: determining each second path and the available occupancy identifier of each second path based on data information that is associated with the first paths and is stored in a priority queue P. The data information may include a weight value of each first path used to compare advantages and disadvantages of the first path during task execution. The data information may further include a number of the first path. In some embodiments, the data information may include a weight value of each target node used to compare advantages and disadvantages of the target node during task execution. The priority queue may store calculated data information of the first paths calculated, or data information of the target nodes calculated. The first path corresponding to the weight value with a minimum value may be selected from the priority queue as the second path. In some embodiments, the target node with a minimum value may be selected from the priority queue as a node through which the mobile apparatus passes. The weight value of the second path may be set to any one of a first weight value, a second weight value, and a third weight value according to a task requirement, or may be a comprehensive weight value determined by summing any one or more of the first weight value, the second weight value, and the third weight value.

The first weight value Z1 may be a sum D1 of a length L1 of the determined second path (i.e, the selected first paths) and a minimum path length L2 from a downstream path to the target node of a current subtask. The downstream path may be a path that is downstream of the currently selected first path and is directly connected to the currently selected first path. The first weight value Z1 may directly reflect a distance cost from a current position to the target node. In some embodiments, the first weight value Z1 may be a Manhattan distance L3 from the determined second path to the target node of the current subtask. In a regularized operating environment (e.g., a rectangular aisle in a warehouse or a workshop), the Manhattan distance L3 is calculated to replace an actual path length, so that space costs can be quickly estimated, reducing calculation complexity in a complex road network and improving path planning efficiency. In some embodiments, the first weight value Z1 may be a product of D1 and an impact factor F1. In some embodiments, the first weight value Z1 may be a product of the Manhattan distance L3 and the impact factor F1. A value of the impact factor F1 may be set according to a requirement, which may be any positive number and is determined based on the operating environment. The impact factor F1 may be, for example, but not limited to, 1.5, 2, 2.5, 3, 3.5, 4, 4.5, or 5. In some embodiments, the impact factor F1 may be dynamically adjusted. In some embodiments, F1 may be set to 1.5 for a path in a congested area. In some embodiments, F1 may be set to 1 for a path in a non-congested area. In some embodiments, a value of F1 is increased for a path of a narrow passage, to guide the system to preferentially select a wide path, thereby indirectly reducing a collision risk. The first weight value Z1 enables selection of a shortest path from a space dimension, which, by quantifying a physical length or a space cost of a path, ensures that the task can be completed in a shortest distance on the second path.

In some embodiments, the second weight value is a minimum natural number A1 required for the mobile apparatus performing the task to travel from a start point of the task to a downstream path. In some embodiments, the second weight value may be a product of A1 and an impact factor F2. The impact factor F2 may be any positive number and is determined based on the operating environment, which may be, for example, but not limited to, 1.5, 2, 2.5, 3, 3.5, 4, 4.5, or 5. In some embodiments, the impact factor F2 may be dynamically adjusted. In some embodiments, F2=2 is set for a path in a congested area. In some embodiments, F2=1 is set for a path in a non-congested area. In some embodiments, a value of F2 may be increased for a path that needs to avoid another apparatus, so as to prevent a system from selecting a path that requires waiting, thereby reducing a waiting time.

In some embodiments, the third weight value=$10^V-10^N$, where N is the index value of the first path, N is equal to an index value INDEX_1n of the target node of the current subtask, and V is any positive integer greater than a maximum number in the index value INDEX_1n. A value of V may be set flexibly according to a requirement, which may be, for example, but not limited to, 5 or 10. During single task planning, the value of V may remain unchanged. The use of the third weight value may prevent the dispatch system 20 from selecting a path from first paths that have been calculated, to determine a second path from a current position to a next target node, thereby reducing a path backtracking probability. For example, when a second path from the start point to the first target node has been planned, during the planning of the second path from the first target node to the second target node, a third weight value of a first path that has been calculated and is from the start point to the first target node is $10^3-10_1=990$, where V=3 and N=1, and a third weight value of a first path that has not been calculated and is from the first target node to the second target node is $10^3-10^2=900$; where V=3, and N=2. Therefore, the first path that has not been calculated and is from the first target node to the second target node has a smaller weight value, and may be preferentially selected as the second path. This can prevent the dispatch system 20 from selecting, from the first paths from the start point to the first target node, a first path to the second target node (such selection is not preferred). A first path that has been calculated and is from the start point to the first target node may be considered only when there is no available first path from the first target node to the second target node, thereby reducing a path backtracking probability. Therefore, the introduction of the third weight value can greatly alleviate the problem of a waste of computing resources caused by random backtracking in a conventional dispatch system.

It should be noted that, although the introduction of the third weight value may cause the system to filter out some path options, it has been demonstrated that such filtering may exclude only unnecessary paths that do not meet a task execution sequence or priority requirement, and may not affect selection of an optimal path, thereby improving calculation efficiency while ensuring rationality of path planning.

In some embodiments, the third weight value may be a product of $10^V$-$10^N$ and an impact factor F3. A value of the impact factor F3 may be set according to a requirement, which may be, for example, but not limited to, 1.5, 2, 2.5, 3, 3.5, 4, 4.5, or 5. In some embodiments, the impact factor F3 may be dynamically adjusted to adapt to a priority of the task.

In addition, by establishing a composite calculation model where a total weight=the third weight valueXF3+the second weight valueXF2+the first weight valueX F1, priorities of dimensions may be flexibly adjusted according to a requirement to implement multi-objective optimization. For example, F2 may be increased in an emergency transportation scenario, F1 may be increased in an energy saving scenario, and F3 may be increased in a multi-subtask collaborative scenario, thereby implementing multi-objective optimization.

As shown in FIG. 6, in some embodiments, operation S105 may include: operation S1051, operation S1052, operation S1053, operation S1054, operation S1055, operation S1056, operation S1057, and operation S1058. A sequence of these operations may be randomly set, provided that the one or more second paths for performing the task and the available occupancy identifier of each second path may be determined.

In operation S1051, the dispatch system 20 may be configured to set the priority queue P to empty.

In operation S1052, the dispatch system 20 may be configured to add the data information of the first path, on which an initial node of a first subtask with the sequence number S=1 is located, to the priority queue P. In some embodiments, the data information of the initial node of the first subtask with the sequence number S=1 may be added to the priority queue P. The data information may be stored in a structured form of <path name, weight value>. In some embodiments, the dispatch system 20 may set a weight value of the first path, on which the initial node of the first subtask is located, to 0, and add the data information of the first path to the priority queue P, to ensure that the path is preferentially retrieved as a start point of task planning. The first path on which the initial node of the first subtask is located may correspond, in physical space, to a path on which the mobile apparatus 30 performing the task is currently located. This design enables path planning to start from an actual position of the mobile apparatus 30, thereby preventing invalid path calculation caused by disconnection of the initial node from the position of the mobile apparatus 30, and improving planning efficiency.

In operation S1053, the dispatch system 20 may be configured to select the first path corresponding to the weight value with a minimum value from the priority queue. In some embodiments, the first path on which the initial node of the first subtask with the sequence number S=1 is located may be selected from the priority queue as the first one of the one or more second paths.

In operation S1054, after the first path having the minimum weight value is selected from the priority queue P, the dispatch system 20 may be configured to determine whether the currently selected first path is directly connected to the task end point of the task. In some embodiments, the dispatch system 20 may be configured to determine, in real time, whether a current position of the mobile apparatus 30 reaches the task end point. In some embodiments, the dispatch system 20 may be configured to determine, by using a graph traversal algorithm, for example, BFS or DFS, whether the current path is directly connected to the task end point. In accordance with a determination that the currently selected first path is directly connected to the task end point of the task, operation S1055 is performed. In accordance with a determination that the currently selected first path is not directly connected to the task end point of the task, operation S1056 is performed.

In operation S1055, the dispatch system 20 may be configured to determine all the selected first paths as the one or more second paths, and determine that the available occupancy identifiers of the one or more second paths are equal to available occupancy identifiers of the selected first paths. In some embodiments, when detecting that a path is directly connected to the task end point, the dispatch system 20 may be configured to merge all selected first paths into a complete second path.

In operation S1056, the dispatch system 20 may be configured to determine a subsequent path of the currently selected first path. A downstream path segment directly adjacent to the current path may be retrieved based on an end point of the current path.

As shown in FIG. 7, in some embodiments, operation S1056 may include: operation S1056A, operation S1056B, operation S1056C, operation S1056D, operation S1056E, and operation S1056F. A sequence of these operations may be randomly set, provided that the subsequent path of the currently selected first path may be determined.

In operation S1056A, the dispatch system 20 may be configured to determine whether the currently selected first path is directly connected to a target node of a currently performed subtask. In some embodiments, the dispatch system 20 may be configured to determine, by using a graph traversal algorithm, for example, BFS or DFS, whether the current path is directly connected to the target node of the subtask. In accordance with a determination that the currently selected first path is directly connected to the target node of the current subtask, operation S1056B is performed. In accordance with a determination that the currently selected first path is not directly connected to the target node of the current subtask, operation S1056C is performed.

In operation S1056B, the dispatch system 20 may be configured to determine each downstream path of the currently selected first path, and may add 1 to a value of an index value N of a first path downstream of the currently selected first path. In some embodiments, the dispatch system 20 may be configured to determine each downstream path of the currently selected first path, and update the index value N of the first path downstream of the currently selected first path to a sequence number S of a next subtask. In some embodiments, the dispatch system 20 may be configured so that a first path located downstream automatically inherits an index value N of an upstream path directly connected thereto; and each time one target node is passed, the first path located downstream automatically inherits the index value N of the upstream path directly connected thereto, and the index value N thereof may be further increased by 1. In some embodiments, the dispatch system 20 may be configured so that an initial value of the index value N configured for each first path is equal to the index value $INDEX\_1_1$ of the first target node, and each time one target node is passed, an index value N of a first path that has not been calculated is set to an index value INDEX_1n of a next target node.

In operation S1056C, the dispatch system 20 may be configured to determine each downstream path of the currently selected first path, and the downstream path is a path that is downstream of the currently selected first path and is directly connected to the currently selected first path.

In operation S1056D, the dispatch system 20 may be configured to determine whether each downstream path is directly connected to the target node of the current subtask. In accordance with a determination that one or more of the downstream paths is directly connected to the target node of the current subtask, operation S1056E is performed. In accordance with a determination that one or more of the downstream paths is not directly connected to the target node of the current subtask, operation S1056F is performed.

In operation S1056E, the weight value of the first path directly connected to the target node of the current subtask may be set to 0.

In operation S1056F, the dispatch system 20 may be configured to compare an available occupancy identifier of the currently selected first path with an initial occupancy identifier of each downstream path, to determine an available occupancy identifier of each downstream path. Said determining an available occupancy identifier of each downstream path may include: for a first path segment $M_1$ in the first path, determining an available occupancy identifier of $M_1$ as an initial occupancy identifier of $M_1$. For any two adjacent first paths $M_i$ and $M_u$, where i>0, u>0 and, i and u are positive integers and $M_i$ is upstream of $M_u$, an available occupancy identifier of $M_u$ may be determined based on the following rule: acquiring an available occupancy identifier of the currently selected first path $M_i$; determining a minimum occupancy identifier (which is generally a multiple of a minimum scale of an occupancy identifier) required for traveling from $M_i$ to $M_u$; and selecting, from an initial occupancy identifier of $M_u$, an identifier whose execution sequence is no less than "the available occupancy identifier of $M_i$"+ "the minimum occupancy identifier required for traveling from $M_i$ to $M_u$" as the available occupancy identifier of $M_u$. In some embodiments, if the available occupancy identifier of the selected first path is empty, operation S1053 is performed again to reselect a sub-optimal path.

In operation S1056G, the dispatch system 20 may be configured to calculate a weight value of each downstream path.

In operation S1056H, the dispatch system 20 may be configured to add the weight value of each downstream path to the priority queue.

Referring back to FIG. 6, in operation S1057, the dispatch system 20 may be configured to determine whether the priority queue includes the data information. In accordance with a determination that the priority queue includes the data information, return to step S1053 of selecting the first path with the minimum weight value from the priority queue. In accordance with a determination that the priority queue does not include the data information, operation S1058 is performed.

In operation S1058, the dispatch system 20 may be configured to stop planning.

In some embodiments, the dispatch system 20 may be configured to perform operation S105 by using, for example, but not limited to, a coverage matching method, an A algorithm, a D Lite algorithm, tabu search, a genetic algorithm, PSO, a dynamic programming algorithm, or multi-agent negotiation.

Referring back to FIG. 3, in operation S107, the dispatch system 20 may be configured to send the determined second path to the RCS for controlling the mobile apparatus to perform the task according to the second path. Before sending the second path to the RCS, the dispatch system 20 may determine a predetermined occupancy identifier of each second path based on the one or more second paths and the available occupancy identifier of each second path. The predetermined occupancy identifier may refer to an execution sequence in which the mobile apparatus 30 actually travels on the corresponding path. The dispatch system 20 may determine the predetermined occupancy identifier by result backtracking. In some embodiments, the predetermined occupancy identifier of the second path may be determined by using any appropriate method. In some embodiments, the determined second path and the predetermined occupancy identifier of the second path may be sent to the RCS.

Operation S105 and operation S107 are now described with reference to FIG. 10, FIG. 11B, FIG. 11C, FIG. 11D, FIG. 11E, FIG. 11F, and FIG. 11G. FIG. 11B, FIG. 11C, FIG. 11D, FIG. 11E, FIG. 11F, and FIG. 11G are detailed schematic flowcharts of a path planning method according to some embodiments of the present disclosure, a path planning method for the task T2 shown in FIG. 10. It should be noted that all examples in the present disclosure are merely examples and are not intended to limit the present disclosure. In this embodiment of the present disclosure, the length of each of the paths M1 to M15 is about 5 meters.

Figure 11B:
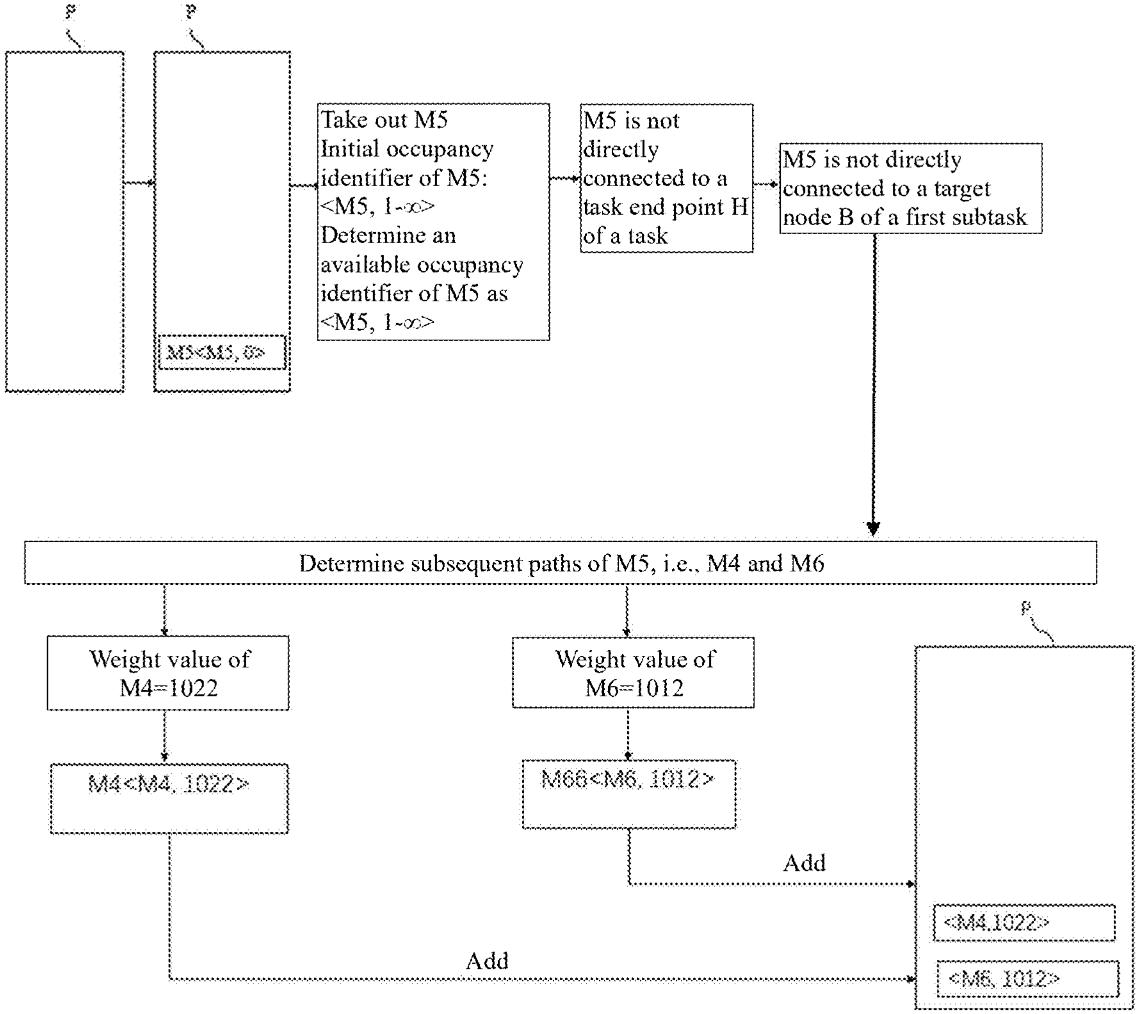

For the task T2, the mobile apparatus 30 selected for the task T2 is located on the path M5. As shown in FIG. 11B, the dispatch system 20 may be configured to first set the priority queue P to empty, set a weight value of the first path M5, on which the initial node of the first subtask with the sequence number S=1 is located, to 0, and add data information <M5, 0> to the priority queue P. Then, the dispatch system 20 may be configured to select the first path corresponding to the weight value with a minimum value from the priority queue P, that is, M5, as the first one of the one or more second paths. The dispatch system 20 may be configured to extract a predetermined initial occupancy identifier [1-∞) of M5. For a first segment path M5 in the first path, an available occupancy identifier of M5 is determined as the initial occupancy identifier [1-∞).

Then, the dispatch system 20 may be configured to determine whether the currently selected first path M5 is directly connected to a task end point H of the task T2. If a determination result is No, the dispatch system 20 may be configured to continuously determine a subsequent path of the currently selected first path M5. The continuously determining a subsequent path of the currently selected first path M5 may include: the dispatch system 20 may be configured to determine whether the currently selected first path M5 is directly connected to a target node B of a currently performed first subtask. If a determination result is No, the dispatch system 20 may be configured to determine downstream paths of the currently selected first path M5, i.e., M4 and M6. Then, the dispatch system 20 may be configured to determine whether M4 and M6 are directly connected to the target node B of the current subtask. If a determination result is No, the dispatch system 20 may be configured to respectively compare the available occupancy identifier [1-∞) of the currently selected first path M5 with initial occupancy identifiers [1-∞) of the paths M4 and M6, to respectively determine available occupancy identifiers of the paths M4 and M6. For two adjacent first paths M5 and M4, where M5 is upstream of M4, the available occupancy identifier of M4 may be determined based on the following rule: acquiring the available occupancy identifier [1-∞) of the currently selected first path M5; determining a minimum occupancy identifier "1" (1 times the minimum scale of the occupancy identifier) required for traveling from M5 to M4; and selecting, from the initial occupancy identifier of M4, an identifier whose execution sequence is no less than "the available occupancy identifier [1-∞) of M5" plus "the minimum occupancy identifier required for traveling from M5 to M4" ("1"), that is, [2-∞), as the available occupancy identifier of M4. A process of determining the available occupancy identifier of M6 is similar to that of M4, and the available occupancy identifier thereof is [2-∞). Then, the dispatch system 20 may calculate weight values of the downstream paths M4 and M6. The weight values of M4 and M6 are both a sum of the first weight value, the second weight value, and the third weight value, and calculation processes are as follows:

A first weight value of M4 is Z1=L1+L2, L1 is equal to the length of the determined second path M5, which is 5 meters, and L2 is equal to a minimum path (M4, M5, M6, M8, and M10) length from the downstream path M4 to the target node B of the current subtask, which is 25 meters, that is, D1=L1+L2-30 meters.

A first weight value of M6 is Z1=L1+L2, L1 is equal to the length of the determined second path M5, which is 5 meters, and L2 is equal to a minimum path length from the downstream path M6 to the target node B of the current subtask, which is 15 meters, that is, D1=L1+L2=20 meters.

A second weight value of M4 is a minimum natural number A1 required for the mobile apparatus performing the task to travel from a start point D of the task to the downstream path M4. Herein, A1=2.

A second weight value of M6 is a minimum natural number A1 required for the mobile apparatus performing the task to travel from the start point D of the task to the downstream path M6. Herein, A1=2.

A third weight value of M4=$10^V-10^N$, where N is the index value of the first path, which is equal to 1, a value of Vis 3, and the third weight value of M4=$10^3-10^1$=990.

A third weight value of M6=$10^V-10^N$, where N is the index value of the first path, which is equal to 1, a value of V is 3, and the third weight value of M6=$10^3-10^1$=990.

A total weight value of M4=30+2+990=1022.

A total weight value of M6=20+2+990=1012.

Then, data information <M4, 1022> and <M6, 1012> of M4 and M6 is added to the priority queue P.

Then, the dispatch system 20 may determine whether the priority queue P includes the data information. If a determination result is Yes, return to the step of selecting the first path with a minimum weight value from the priority queue.

Figure 11C:
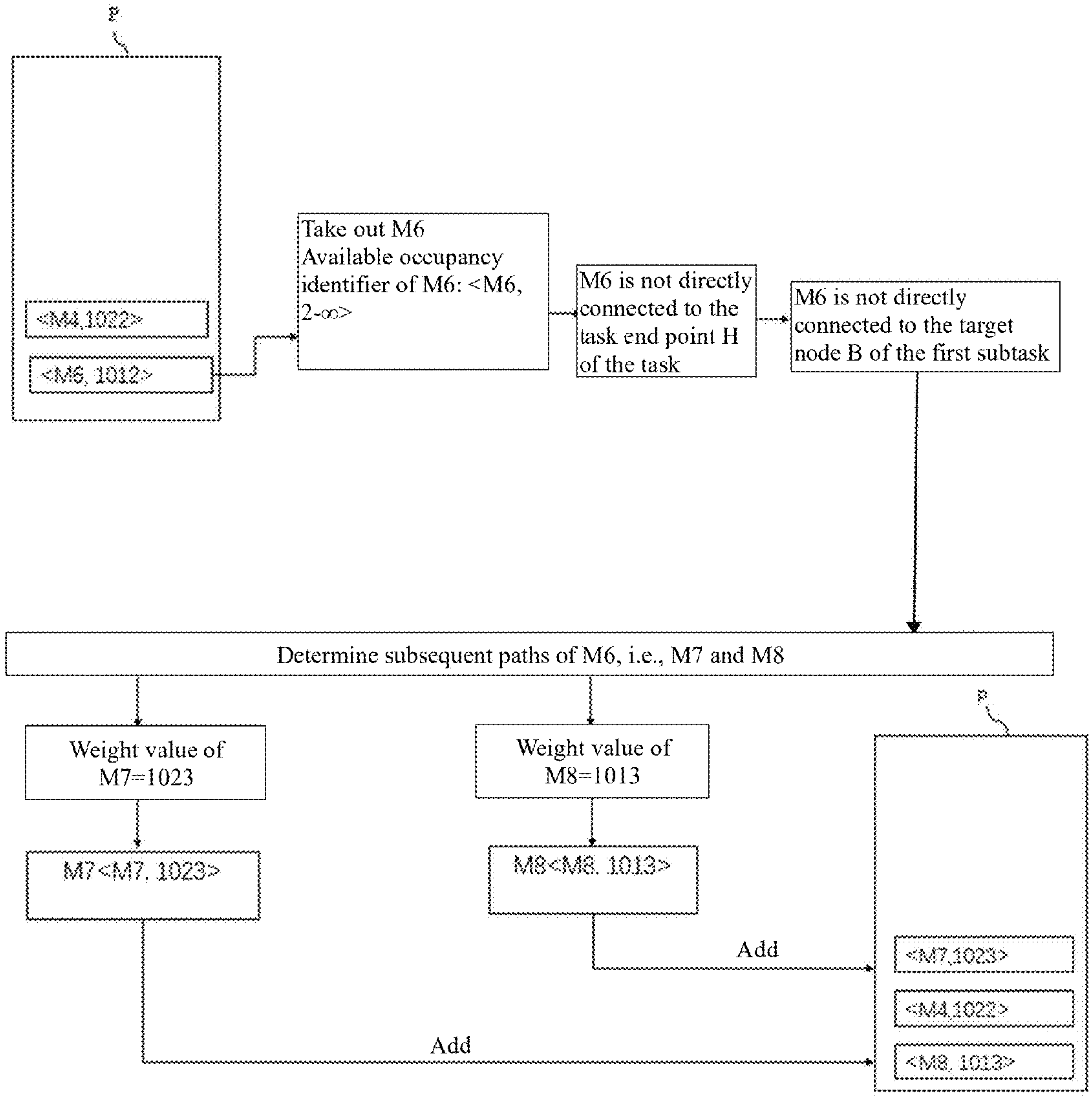

As shown in FIG. 11C, the dispatch system 20 may be configured to select the first path M6 with the minimum weight value from the priority queue P and the available occupancy identifier [2-∞) thereof. After selecting M6, the dispatch system 20 may be configured to determine whether M6 is directly connected to the task end point of the task. If a determination result is No, the dispatch system 20 may be configured to continuously determine a subsequent path of the currently selected first path M6. The continuously determining a subsequent path of M6 may include: the dispatch system 20 may be configured to determine whether M6 is directly connected to the target node B of the currently performed first subtask. If a determination result is No, the dispatch system 20 may be configured to determine downstream paths of M6 as M7 and M8. Next, the dispatch system 20 may be configured to determine whether M7 and M8 are directly connected to the target node B of the current subtask. If a determining result is No, the dispatch system 20 may be configured to respectively compare the available occupancy identifier [2-∞) of the currently selected first path M6 with initial occupancy identifiers [1-∞) of the paths M7 and M8, to respectively determine available occupancy identifiers of the paths M7 and M8. For two adjacent first paths M8 and M6, where M6 is upstream of M8, the available occupancy identifier of M8 may be determined based on the following rule: acquiring the available occupancy identifier [2-∞) of the currently selected first path M6; determining a minimum occupancy identifier "1" (1 times the minimum scale of the occupancy identifier) required for traveling from M6 to M8; and selecting, from the initial occupancy identifier of M8, an identifier whose execution sequence is no less than "the available occupancy identifier of M6" plus "the minimum occupancy identifier required for traveling from M6 to M8" ("1"), that is, [3-∞), as the available occupancy identifier of M8. A process of determining the available occupancy identifier of M7 is similar to that of M8, and the available occupancy identifier thereof is [3-∞). Next, the dispatch system 20 may calculate weight values of the downstream paths M7 and M8. The weight values of M7 and M8 are both a sum of the first weight value, the second weight value, and the third weight value, and calculation processes are as follows:

A first weight value of M7 is Z1=L1+L2, L1 is equal to the lengths of the determined second paths M5 and M6, which is 10 meters, and L2 is equal to a minimum path length from the downstream path M7 to the target node B of the current subtask, which is 20 meters, that is, D1=L1+L2=30 meters.

A first weight value of M8 is Z1=L1+L2, L1 is equal to the lengths of the determined second paths M5 and M6, which is 10 meters, and L2 is equal to a minimum path length from the downstream path M8 to the target node B of the current subtask, which is 10 meters, that is, D1=L1+L2=20 meters.

A second weight value of M7 is a minimum natural number A1 required for the mobile apparatus performing the task to travel from the start point D of the task to the downstream path M7. Herein, A1=3.

A second weight value of M8 is a minimum natural number A1 required for the mobile apparatus performing the task to travel from the start point D of the task to the downstream path M8. Herein, A1=3.

A third weight value of M7=$10^V-10^N$, where N is the index value of the first path, which is equal to 1, a value of Vis 3, and the third weight value of M7=$10^3-10^1$=990.

A third weight value of M8=$10^V-10^N$, where N is the index value of the first path, which is equal to 1, a value of V is 3, and the third weight value of M8=$10^3$-$10^1$=990.

A total weight value of M7=30+3+990=1023.

A total weight value of M8=20+3+990=1013.

Next, the dispatch system 20 may add data information <M7, 1023> and <M8, 1013> of M7 and M8 to the priority queue P.

Next, the dispatch system 20 may be configured to determine whether the priority queue P includes the data information. If a determination result is Yes, return to the step of selecting the first path with a minimum weight value from the priority queue.

Figure 11D:
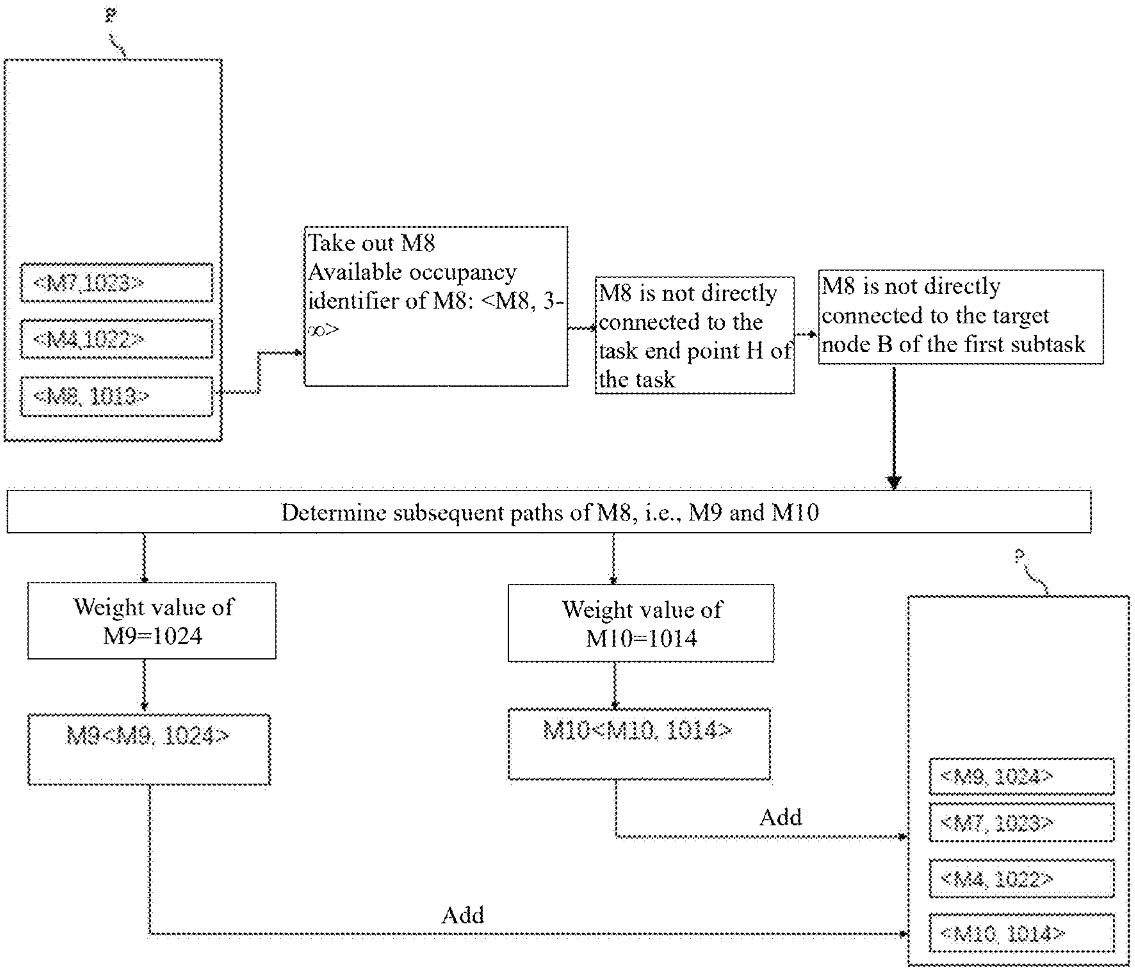

As shown in FIG. 11D, the dispatch system 20 may be configured to select the first path M8 with the minimum weight value from the priority queue P and the available occupancy identifier [3-∞) thereof. Similar to the calculation process in FIG. 11C, the dispatch system 20 may be configured to determine available occupancy identifiers [4-∞) of M9 and M10, and a total weight value of the downstream path M9 of the first path M8=D1(30)+A1(4)+($10^3-10^1$)=1024, and a total weight value of the downstream path M10 of the first path M8=D1(20)+A1(4)+($10^3-10^1$)=1014, and add data information <M9, 1024> and <M10, 1014> of M9 and M10 to the priority queue P.

Figure 11E:
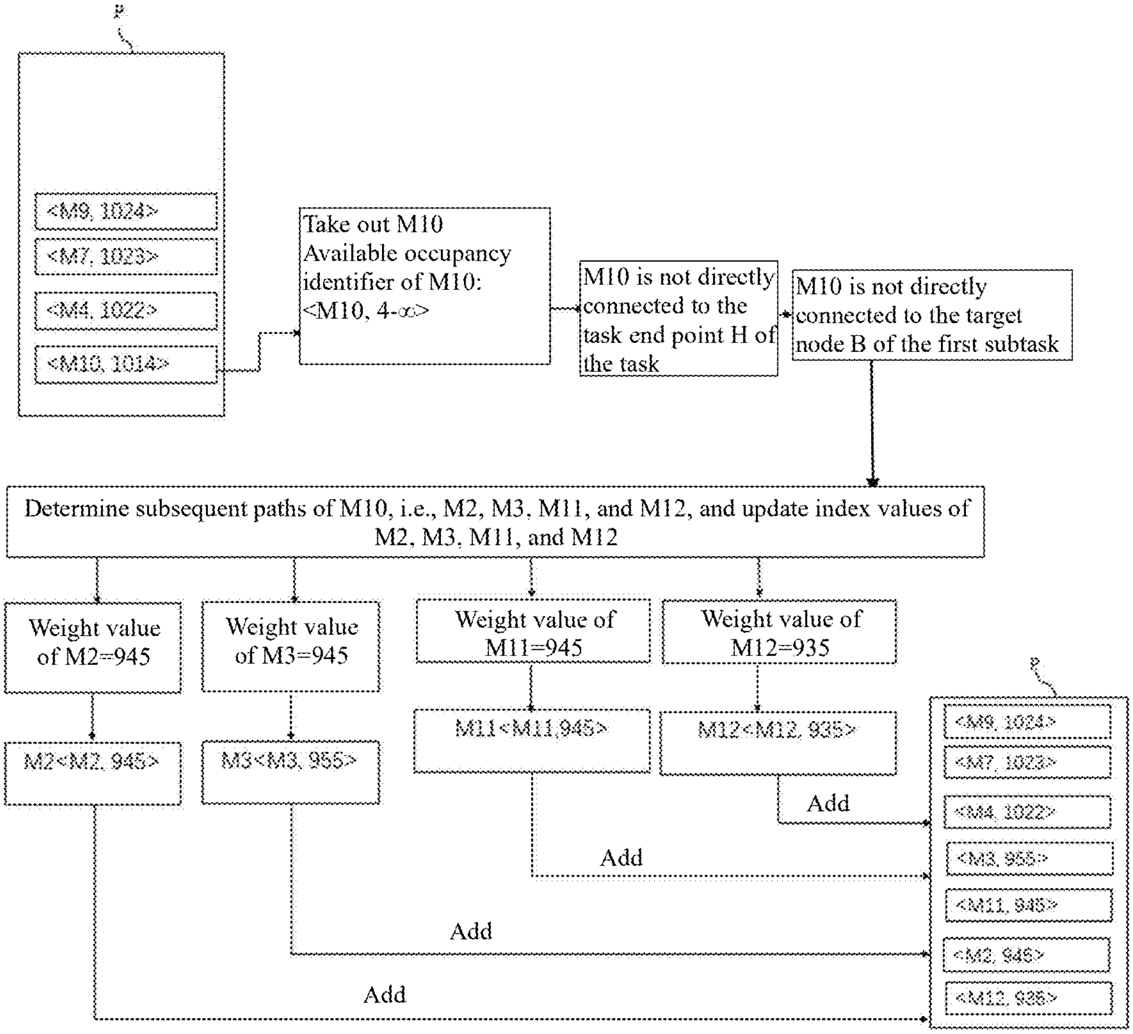

As shown in FIG. 11E, the dispatch system 20 may be configured to select the first path M10 with the minimum weight value from the priority queue P and the available occupancy identifier [4-∞) thereof. The process is similar to the process shown in FIG. 11D. A difference lies in that the dispatch system 20 is configured to determine that the first path M10 is directly connected to the target node B of the first subtask. In this case, the dispatch system 20 may be configured to add 1 to the index values 1 of M12, M2, M11, and M3, becoming 2. Therefore, third weight values of M12, M2, M11, and M3=$10^3-10^2$=900. The dispatch system 20 may be configured to determine available occupancy identifiers [5-∞) of M2, M3, M11, and M12, determine a total weight value of M12=D1(30)+A1(5)+($10^3-10^2$)=935, determine a total weight value of M2=D1(40)+A1(5)+($10^3-10^2$)=945, determine a total weight value of M3=D1(50)+A1(5)+($10^3-10^2$)=955, and determine a total weight value of M11=D1(40)+A1(5)+($10^3-10^2$)=945.

Figure 11F:
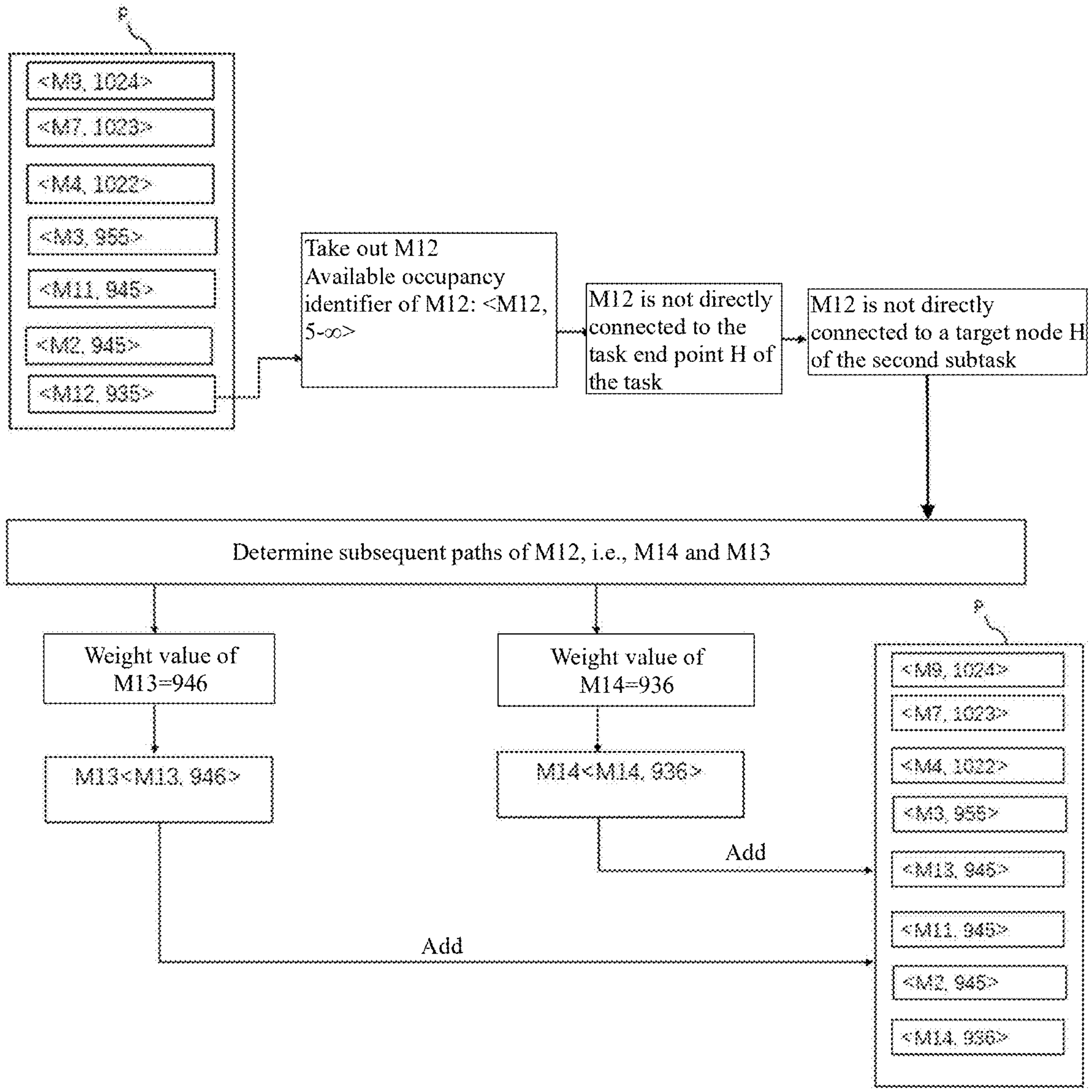

As shown in FIG. 11F, the dispatch system 20 may be configured to select the first path M12 with the minimum weight value from the priority queue P and the available occupancy identifier [5-∞) thereof. Similar to the calculation process in FIG. 11D, the dispatch system 20 is configured to determine available occupancy identifiers [6-∞) of the downstream paths M13 and M14 of the first path M12, determine a total weight value of M14=D1(30)+A1(6)+($10^3-10^2$)=936, determine a total weight value of M13=D1(40)+A1(6)+($10^3-10^2$)=946, and add data information <M13, 946> and <M14, 936> of M13 and M14 to the priority queue P.

Figure 11G:
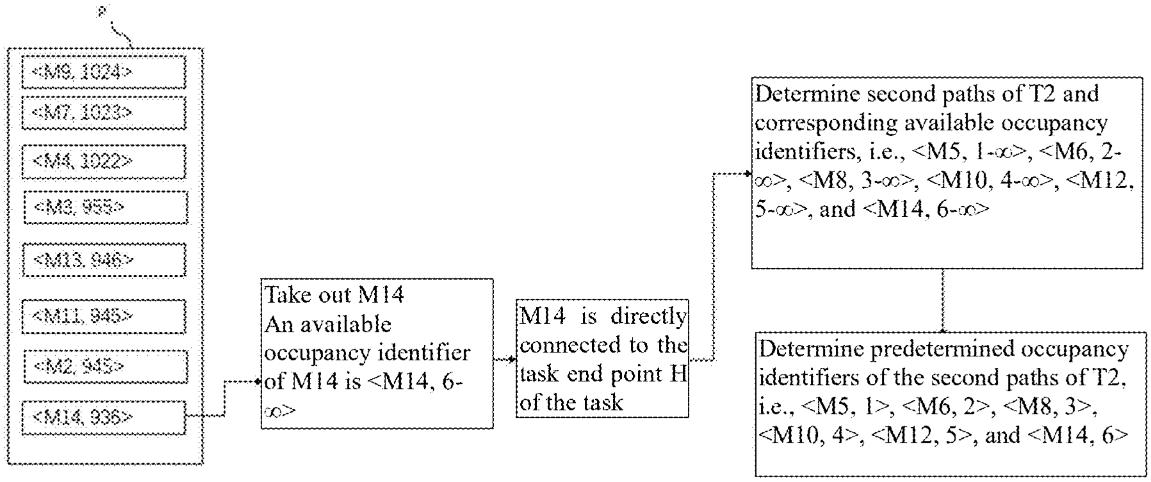

As shown in FIG. 11G, the dispatch system 20 may be configured to select the first path M14 with the minimum weight value from the priority queue P and the available occupancy identifier [6-∞) thereof. The dispatch system 20 may be configured to determine whether the path M14 is directly connected to the task end point H of the task. All the selected first paths M5, M6, M8, M10, M12, and M14 may be determined as the second paths, and it is determined that the available occupancy identifiers of the second path are equal to available occupancy identifiers of the selected first paths, that is, the available occupancy identifier of M5 is [1-∞), the available occupancy identifier of M6 is [2-∞), the available occupancy identifier of M8 is [3-∞), the available occupancy identifier of M10 is [4-∞), the available occupancy identifier of M12 is [5-∞), and the available occupancy identifier of M14 is [6-∞).

It is known that a minimum travel occupancy identifier of the mobile apparatus 30 on each path is 1. Assuming that a travel occupancy identifier to the task end point H needs to be 6, an end point of M12 needs to be reached at the $5^{th}$ occupancy identifier, an end point of M10 needs to be reached at the $4^{th}$ occupancy identifier, an end point of M8 needs to be reached at the $3^{rd}$ occupancy identifier, an end point of M6 needs to be reached at the $2^{nd}$ occupancy identifier, and an end point of M5 needs to be reached at the $1^{st}$ occupancy identifier. In this way, it may be optionally set that a predetermined occupancy identifier of the second path M14 is [6-6], a predetermined occupancy identifier of the second path M12 is [5-5], a predetermined occupancy identifier of the second path M10 is [4-4], a predetermined occupancy identifier of the second path M8 is [3-3], a predetermined occupancy identifier of the second path M6 is [2-2], and a predetermined occupancy identifier of the second path M5 is [1-1]. The dispatch system 20 may be configured to send the determined second paths M5, M6, M8, M10, M12, and M14 and the corresponding predetermined occupancy identifiers to the RCS 10, that is, send <M5, 1>, <M6, 2>, <M8, 3>, <M10, 4>, <M12, 5>, and <M14, 6> to the RCS 10.

According to the path planning method of the present disclosure, by setting the occupancy identifiers to identify an execution sequence of the planned paths, the travel speed of the mobile apparatus and the length of each path can be ignored, thereby resolving the problem that a time at which the mobile apparatus arrives at a specified node cannot be accurately predicted by using a global roaming multi-vehicle scheduling algorithm based on absolute time, ensuring high efficiency of traffic management and stable system operation, and leading to higher efficiency and reliability. In addition, the present disclosure does not use an absolute time such as hours, minutes, or seconds in a traditional sense as a time unit, but uses an occupancy identifier having no temporal meaning as a basis for determining whether the mobile apparatus passes preferentially when arriving at a position where a conflict with another mobile apparatus occurs, which can prevent the problem of deadlock existing in a local control path algorithm. In addition, by using the design of configuring an index value for each target node and configuring index values for paths according to an execution sequence of a task, an execution sequence of a task flow is effectively ensured, and applicability and flexibility of the dispatch system on site are improved.

In some embodiments, the path planning method S100 may further include operation S109. In operation S109, the dispatch system 20 may be configured to further calculate a control path in real time based on a real-time position of the mobile apparatus, so as to control traveling of the mobile apparatus in real time.

As shown in FIG. 8, in some embodiments, operation S109 may further include: operation S1091, operation S1092, operation S1093, and/or operation S1094.

In operation S1091, the dispatch system 20 may be configured to receive current position information of the mobile apparatus performing the task. The current position information may include at least a current X coordinate and a current Y coordinate of the mobile apparatus.

In operation S1092, the dispatch system 20 may be configured to determine a current predetermined occupancy identifier $A_{current}$ of the mobile apparatus based on the current position information. In some embodiments, the dispatch system 20 may be configured to determine, based on the current X coordinate and the current Y coordinate of the mobile apparatus, a path on which the mobile apparatus is located in this case, and determine the current predetermined occupancy identifier $A_{current}$ of the mobile apparatus based on a determined path and a predetermined occupancy identifier corresponding to a planned second path.

In operation S1093, the dispatch system 20 may be configured to acquire a maximum length of a third path sent to the RCS, where the third path is selected from the second path. The third path may be a control path. The dispatch system 20 may be configured to determine a minimum one of a first length and a second length, where the first length is equal to a path length upper limit preset by the dispatch system, and the second length is a maximum feasible path length from the current position of the mobile apparatus. Since the control path cannot be recycled after being delivered to the mobile apparatus, it is recommended that the control path sent each time should not be excessively long. On the other hand, by designing the maximum length, the time consumed by a single calculation may be reduced.

In operation S1094, the dispatch system 20 may be configured to sequentially select, starting from the current predetermined occupancy identifier $A_{current}$, the one or more second paths in ascending order of predetermined occupancy identifiers, to generate a third path, until any one of the following conditions is met: a cumulative length of the selected second paths reaches a maximum length; no second path is available for selection; and the generated third path is sent to the RCS.

As shown in FIG. 9, in some embodiments, operation S1094 may further include: operation S1094A and operation S1094B.

In operation S1094A, the dispatch system 20 may be configured to determine, for each to-be-executed second path, a predetermined occupancy identifier $A_i$ corresponding thereto.

In operation S1094B, the dispatch system 20 may be configured to compare $A_i$ with a current predetermined occupancy identifier $A_{other}$ of another mobile apparatus performing another task, and in accordance with a determination that $A_i<A_{other}$, determine a corresponding to-be-executed second path as the third path; in accordance with a determination that $A_i \geq A_{other}$, determine whether the another mobile apparatus conflicts with the mobile apparatus performing the task in a range from $A_{other}$ to $A_i$, and in accordance with a determination that the another mobile apparatus conflicts with the mobile apparatus performing the task, skip the corresponding to-be-executed second path; and in accordance with a determination that the another mobile apparatus does not conflict with the mobile apparatus performing the task, determine the corresponding to-be-executed second path as the third path, and continuously determine whether a subsequent to-be-executed second path conflicts with a path of the another mobile apparatus, until any one of the conditions is met. A process of determining the current predetermined occupancy identifier $A_{other}$ is consistent with that of determining the current predetermined occupancy identifier $A_{current}$. The dispatch system 20 may be configured to determine whether the length of the third path reaches the maximum length of the third path. If yes, the third path is sent to the RCS. In some embodiments, after it is detected that a conflict exists, the dispatch system 20 may be configured to perform operation S109 in a loop, until a third path without a conflict is obtained or it is determined that no third path is available currently (in this case, a path re-planning mechanism may be triggered).

Operation S109 is now continuously described by using the foregoing task T2. By using the foregoing path planning method S100, the one or more second paths and predetermined occupancy identifiers corresponding thereto: <M5, 1>, <M6, 2>, <M8, 3>, <M10, 4>, <M12, 5>, and <M14, 6>, are planned for T2.

The dispatch system 20 is configured to receive current position information of the mobile apparatus 30 performing the task T2, determine, based on the current position information, that the mobile apparatus 30 performing the task T2 is located on the path M5 in this case, and determine a current predetermined occupancy identifier $A_{current}=1$ of the mobile apparatus 30 based on the determined path M5 and a corresponding predetermined occupancy identifier [1-1] of a planned second path. The dispatch system 20 is configured to determine that the maximum length of the third path sent to the RCS is a path length upper limit preset by the dispatch system 20, which is about 20 meters. The dispatch system 20 may be configured to sequentially select, starting from the current predetermined occupancy identifier $A_{current}=1$, the one or more second paths M5, M6, M8, M10, M12, and M14 in order of 1, 2, 3, 4, 5, and 6 of the predetermined occupancy identifiers. The sequentially selecting the one or more second paths M5, M6, M8, M10, M12, and M14 in order of 1, 2, 3, 4, 5, and 6 of the predetermined occupancy identifiers may include:

Firstly, for the second path M5, the dispatch system 20 is configured to determine a predetermined occupancy identifier $A_i=1$ corresponding thereto, and determine a current predetermined occupancy identifier $A_{other}=1$ of the mobile apparatus performing the task T1. Then, the dispatch system 20 is configured to compare$A_i$ with $A_{other}$, and finds $A_i=A_{other}$. The dispatch system 20 is configured to determine that when the occupancy identifier is 1, the mobile apparatuses 30 for T2 and T1 are on the paths M5 and M1 respectively, and there is no conflict between the two. Therefore, the dispatch system 20 is configured to determine the second path M5 as the third path, and determine that the length of the third path M5 is about 5 meters.

For the second path M6, the dispatch system 20 is configured to determine a predetermined occupancy identifier $A_i=2$ corresponding thereto, and determine a current predetermined occupancy identifier $A_{other}=1$ of the mobile apparatus performing the task T1. Then, the dispatch system 20 is configured to compare$A_i$ with $A_{other}$, and finds $A_i>A_{other}$. When the dispatch system 20 is configured to determine that the occupancy identifier is 1, the mobile apparatuses 30 for T2 and T1 are on the paths M5 and M1 respectively, and when the dispatch system 20 is configured to determine that the occupancy identifier is 2, the mobile apparatuses 30 for T2 and T1 are on the paths M6 and M3 respectively. In the above situations, no conflict exists between the two mobile apparatuses. Therefore, the dispatch system 20 is configured to determine the second path M6 as the third path, and determine that the length of the third path M6 is about 5 meters.

For the second path M8, the dispatch system 20 is configured to determine a predetermined occupancy identifier $A_i=3$ corresponding thereto, and determine a current predetermined occupancy identifier $A_{other}=1$ of the mobile apparatus performing the task T1. Then, the dispatch system 20 is configured to compare$A_i$ with $A_{other}$, and finds $A_i>$ and $A_{other}$. When the dispatch system 20 is configured to determine that the occupancy identifier is 1, the mobile apparatuses 30 for T2 and T1 are on the paths M5 and M1 respectively, when it is determined that the occupancy identifier is 2, the mobile apparatuses 30 for T2 and T1 are on the paths M6 and M3 respectively, and when it is determined that the occupancy identifier is 3, the mobile apparatuses 30 for T2 and T1 are on the paths M8 and M3 respectively. In the above situations, no conflict exists between the two mobile apparatuses. Therefore, the dispatch system 20 is configured to determine the second path M8 as the third path, and determine that the length of the third path M8 is about 5 meters.

For the second path M10, the dispatch system 20 is configured to determine a predetermined occupancy identifier $A_i=4$ corresponding thereto, and determine a current predetermined occupancy identifier $A_{other}=1$ of the mobile apparatus performing the task T1. Then, the dispatch system 20 is configured to compare$A_i$ with $A_{other}$, and finds $A_i>$ and $A_{other}$. When the dispatch system 20 is configured to determine that the occupancy identifier is 1, the mobile apparatuses 30 for T2 and T1 are on the paths M5 and M1 respectively, when it is determined that the occupancy identifier is 2, the mobile apparatuses 30 for T2 and T1 are on the paths M6 and M3 respectively, when it is determined that the occupancy identifier is 3, the mobile apparatuses 30 for T2 and T1 are on the paths M8 and M3 respectively, and when it is determined that the occupancy identifier is 4, the mobile apparatuses 30 for T2 and T1 are on the paths M10 and M3 respectively. In the above situations, no conflict exists between the two mobile apparatuses. Therefore, the dispatch system 20 is configured to determine the second path M10 as the third path, and determine that the length of the third path M10 is about 5 meters. The dispatch system 20 is configured to determine that a total length of the third paths is equal to the maximum length of 20 meters, and the dispatch system 20 is configured to send the third paths M5, M6, M8, and M10 to the RCS.

Then, for the second path M12, the dispatch system 20 is configured to determine a predetermined occupancy identifier $A_i=5$ corresponding thereto, and determine a current predetermined occupancy identifier $A_{other}=8$ of a mobile apparatus performing another task T3. Then, the dispatch system 20 is configured to compare$A_i$ with $A_{other}$, and finds $A_i<$and $A_{other}$. The dispatch system 20 is configured to determine the second path M12 as the third path, and determine that the length of the third path M12 is about 5 meters.

Then, for the second path M14, the dispatch system 20 is configured to determine a predetermined occupancy identifier $A_i=6$ corresponding thereto, and determine a current predetermined occupancy identifier $A_{other}=8$ of a mobile apparatus performing another task T3. Then, the dispatch system 20 is configured to compare$A_i$ with $A_{other}$, and finds $A_i<$and $A_{other}$. The dispatch system 20 is configured to determine the second path M14 as the third path, and determine that the length of the third path M14 is about 5 meters. If the dispatch system 20 is configured to determine that no second path is available for selection, the dispatch system 20 is configured to send the third paths M12 and M14 to the RCS.

According to the path planning method disclosed in the present disclosure, by comparing a current occupancy identifier of another mobile apparatus with a currently calculated predetermined occupancy identifier of a mobile apparatus, a control path that may be delivered to the mobile apparatus is calculated. Compared with a global roaming multi-vehicle dispatch algorithm based on absolute time, in the method, the problem of time advance or delay caused by an unstable factor such as the speed of the another mobile apparatus does not need to be determined. Therefore, the method has higher stability and scalability in on-site application.

Figure 12:
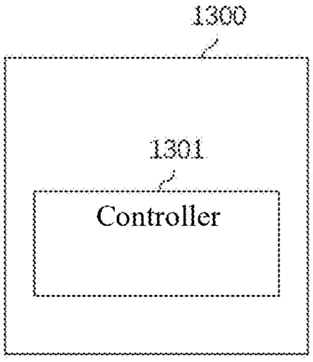
FIG. 12 is a schematic diagram of a dispatch system according to some embodiments of the present disclosure.

FIG. 12 is a schematic diagram of a dispatch system 1300 according to some embodiments of the present disclosure.

As shown in FIG. 12, the dispatch system 1300 includes a controller 1301. The dispatch system 1300 may be similar to the dispatch system 20. In some embodiments, the dispatch system 1300 may dispatch, for example, but not limited to, any intelligent mobile apparatus such as a mobile robot, an autonomous mobile device, an unmanned aerial vehicle, a material handling device, or an automated guided forklift. The mobile robot may include, for example, but not limited to, an AGV, an AMR, a humanoid robot, a floor washing robot, a floor sweeping robot, an agricultural robot, an inspection robot, and the like. The autonomous mobile device may include, for example, but not limited to, a smart car and a smart electric vehicle. In some embodiments, the controller 1301 of the dispatch system 1300 generally includes parts such as a processor, a memory, an input/output interface, a motherboard, and peripheral circuits and elements at a hardware level. In some embodiments, the controller of the dispatch system 1300 generally includes parts such as a control algorithm, an operating system, and a communication protocol at a software level. In some embodiments, the controller 1301 is a plug-and-play apparatus. In some embodiments, the controller 1301 is connected to the mobile apparatus in a wired or wireless manner. The controller 1301 of the dispatch system 1300 herein may refer to a controller set configured to perform the same task or different tasks. The controller 1301 of the dispatch system 1300 is configured to implement the dispatch method described above and any variation thereof that does not depart from the spirit of the present disclosure.

Figure 13:
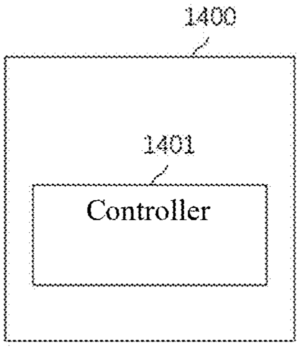
FIG. 13 is a schematic diagram of a mobile apparatus according to another embodiment of the present disclosure.

FIG. 13 is a schematic diagram of a mobile apparatus 1400 according to another embodiment of the present disclosure.

As shown in FIG. 13, the mobile apparatus 1400 includes a controller 1401. The mobile apparatus 1400 is similar to the mobile apparatus 30. In some embodiments, the mobile apparatus 1400 may be, for example, but not limited to, any intelligent mobile apparatus such as a mobile robot, an autonomous mobile device, an unmanned aerial vehicle, a material handling device, or an automated guided forklift. The mobile robot may include, for example, but not limited to, an AGV, an AMR, a humanoid robot, a floor washing robot, a floor sweeping robot, an agricultural robot, an inspection robot, and the like. The autonomous mobile device may include, for example, but not limited to, a smart car and a smart electric vehicle. In some embodiments, the controller 1401 of the mobile apparatus 1400 generally includes parts such as a processor, a memory, an input/output interface, a motherboard, and peripheral circuits and elements at a hardware level. In some embodiments, the controller 1401 of the mobile apparatus 1400 generally includes parts such as a control algorithm, an operating system, and a communication protocol at a software level. In some embodiments, the controller 1401 is a plug-and-play apparatus. In some embodiments, the controller 1401 is connected to the mobile apparatus in a wired or wireless manner. The controller 1401 of the mobile apparatus 1400 herein may refer to a controller set configured to perform the same task or different tasks. The controller 1401 of the mobile apparatus 1400 is configured to implement the dispatch method described above and any variation thereof that does not depart from the spirit of the present disclosure.

Figure 14:
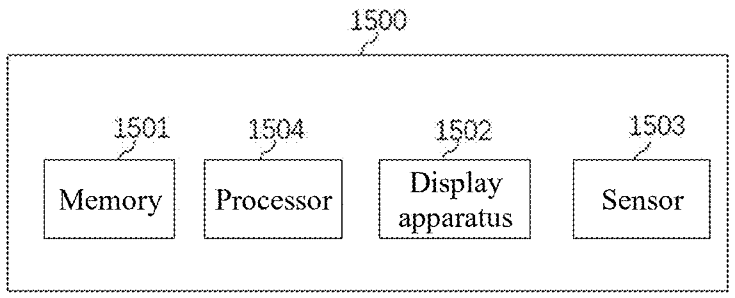
FIG. 14 is a schematic diagram of a mobile apparatus according to another embodiment of the present disclosure.

FIG. 14 is a schematic diagram of a mobile apparatus 1500 according to another embodiment of the present disclosure. The mobile apparatus 1500 may be similar to the mobile apparatus 30. In some embodiments, the mobile apparatus 1500 includes a memory 1501, a display apparatus 1502, a sensor 1503, and a processor 1504. In some embodiments, the processor 1504 is operably coupled to the memory 1501, the display apparatus 1502, and the sensor 1503. In some embodiments, the processor 1504 implements, in cooperation with the memory 1501, the display apparatus 1502, and the sensor 1503, the dispatch method provided in the present disclosure. In some embodiments, the processor 1504 may be an integrated element. The processor 1504 may include a plurality of control units/processing units. The processor 1504 may be configured to load data information from the memory 1501. The processor 1504 may store the data information into the memory 1501. The processor 1504 may receive and process an input (such as a touch operation) of a user on the display apparatus 1502 or data sensed by the sensor 1503. It should be noted that the present disclosure does not limit that the processor 1504 is implemented by hardware, software, or a combination of hardware and software.

In some embodiments, the memory 1501 may be an integrated element. The memory 1501 may be considered as including a plurality of storage units. Information, for example, but not limited to, data such as a point cloud path, a pose, and a key frame may be separately stored in different storage units or stored in a same storage unit. In some embodiments, the display apparatus 1502 may be a touch screen. In some embodiments, the sensor 1503 is an integrated element. The sensor 1503 may be considered as including a plurality of sensor elements. In some embodiments, the sensor 1503 may include common sensor elements such as a 3D Lidar, an odometer, a gyroscope, and an accelerometer.

The mobile apparatus 1500 implements real-time data dynamic programming of the first path with cooperation of the sensor 1503 and the processor 1504, to prevent a collision and improve operation efficiency. The mobile apparatus 1500 is configured to implement the dispatch method described above and any variation thereof that does not depart from the spirit of the present disclosure.

Figure 15:
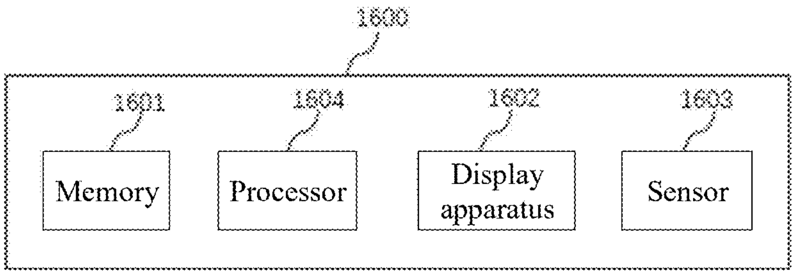
FIG. 15 is a schematic diagram of a dispatch system according to another embodiment of the present disclosure.

FIG. 15 is a schematic diagram of a dispatch system 1600 according to another embodiment of the present disclosure. The dispatch system 1600 may be similar to the dispatch system 20. In some embodiments, the dispatch system 1600 includes a memory 1601, a display apparatus 1602, a sensor 1603, and a processor 1604. In some embodiments, the processor 1604 is operably coupled to the memory 1601, the display apparatus 1602, and the sensor 1603. In some embodiments, the processor 1604 implements, in cooperation with the memory 1601, the display apparatus 1602, and the sensor 1603, the dispatch method provided in the present disclosure. In some embodiments, the processor 1604 may be an integrated element. The processor 1604 may include a plurality of control units/processing units. The processor 1604 may be configured to load data information from the memory 1601. The processor 1604 may store the data information into the memory 1601. The processor 1604 may receive and process an input (such as a touch operation) of a user on the display apparatus 1602 or data sensed by the sensor 1603. It should be noted that the present disclosure does not limit that the processor 1604 is implemented by hardware, software, or a combination of hardware and software.

In some embodiments, the memory 1601 may be an integrated element. The memory 1601 may be considered as including a plurality of storage units. Information, for example, but not limited to, data such as a point cloud path, a pose, and a key frame may be separately stored in different storage units or stored in a same storage unit. In some embodiments, the display apparatus 1602 may be a touch screen. In some embodiments, the sensor 1603 is an integrated element. The sensor 1603 may be considered as including a plurality of sensor elements. In some embodiments, the sensor 1603 may include common sensor elements such as a 3D Lidar, an odometer, a gyroscope, and an accelerometer.

The dispatch system 1600 is configured to implement the dispatch method described above and any variation thereof that does not depart from the spirit of the present disclosure.

The present disclosure provides a controller, configured to execute program instructions to implement the foregoing operations or steps in the method S100.

The foregoing summarizes features of several embodiments and details of the present disclosure. The embodiments described in the present disclosure may be readily used as a basis for designing or modifying other processes and structures for achieving the same or similar purposes and/or obtaining the same or similar advantages of the embodiments introduced herein. Such equivalent constructions do not depart from the spirit and scope of the present disclosure, and different changes, substitutions, and alterations may be made without departing from the spirit and scope of the present disclosure.

We claim:

1. A path planning method, comprising:

receiving a task, and determining one or more first paths based on the task, wherein the first paths are paths on a map of the task;

determining an initial occupancy identifier of each of the first paths based on current occupancy identifiers of paths in an operating environment;

determining, based on the initial occupancy identifiers, one or more second paths for performing the task and an available occupancy identifier of each of the second paths, wherein each of the current occupancy identifiers, the initial occupancy identifiers, and the available occupancy identifiers comprises a natural number or an interval defined by the natural number, and each of the current occupancy identifiers, the initial occupancy identifiers, and the available occupancy identifiers is used to determine an execution sequence of a corresponding path; and sending the one or more second paths to a robot control system (RCS) for controlling a mobile apparatus to perform the task according to the one or more second paths.

2. The path planning method according to claim 1, wherein the task comprises one or more subtasks, and said determining one or more first paths based on the task comprises:

determining information of each of the subtasks based on the task, wherein the information comprises:

a sequence number S of each of the subtasks, wherein the sequence number S is a positive integer equal to or greater than 1; and a target node of each of the subtasks.

3. The path planning method according to claim 2, wherein the target node is a pickup position, a drop-off position, or a scanning position.

4. The path planning method according to claim 2, further comprising: configuring an index value INDEX_1n for each of the target nodes according to an execution sequence of the task, wherein n is the sequence number S of the subtask, and the index value INDEX_1n=S.

5. The path planning method according to claim 2, wherein said determining, based on the initial occupancy identifiers, one or more second paths for performing the task and an available occupancy identifier of each of the second paths comprises:

determining each of the second paths and the available occupancy identifier of each of the second paths based on data information of the first paths, wherein the data information comprises weight values of the first paths, the weight values being used to compare advantages and disadvantages of each of the first paths during task execution, and the data information is stored in a priority queue.

6. The path planning method according to claim 5, wherein the weight values comprise a first weight value, the first weight value being:

a sum D1 of a length L1 of the determined second path and a minimum path length L2 from a downstream path to the target node of a current subtask, wherein the downstream path is a path that is downstream of the determined second path and is directly connected to the determined second path;

a product of D1 and an impact factor F, wherein the impact factor F is any positive number and is determined based on the operating environment;

a Manhattan distance L3 from the determined second path to the target node of the current subtask; or a product of the Manhattan distance L3 and the impact factor F.

7. The path planning method according to claim 6, wherein the weight values further comprise a second weight value and/or a third weight value, wherein:

the second weight value is a minimum natural number A1 required for the mobile apparatus performing the task to travel from a start point of the task to the downstream path; or a product of A1 and the impact factor F; and the third weight value=$10^V-10^N$, wherein N is an index value of the first path, N is equal to the index value INDEX_1n of the target node of the current subtask, and V is any positive integer greater than a maximum number of the index value INDEX_1n.

8. The path planning method according to claim 5, wherein said determining, based on the initial occupancy identifiers, one or more second paths for performing the task and an available occupancy identifier of each of the second paths comprises:

setting the priority queue to empty; and adding the data information of the first path, on which an initial node of the subtask with the sequence number S=1 is located, to the priority queue, and setting the weight value of the data information of the first path, on which the initial node of the subtask with the sequence number S=1 is located, to 0.

9. The path planning method according to claim 5, wherein said determining, based on the initial occupancy identifiers, one or more second paths for performing the task and an available occupancy identifier of each of the second paths comprises:

selecting the first path with a minimum weight value from the priority queue.

10. The path planning method according to claim 9, wherein the method further comprises:

determining, after the first path with the minimum weight value is selected from the priority queue, whether the currently selected first path is directly connected to a task end point of the task, and in accordance with a determination that the currently selected first path is directly connected to the task end point of the task:

determining all the selected first paths as the one or more second paths, and determining that the available occupancy identifiers of the one or more second paths are equal to available occupancy identifiers of the selected first paths; and in accordance with a determination that the currently selected first path is not directly connected to the task end point of the task:

determining a subsequent path of the currently selected first path.

11. The path planning method according to claim 10, wherein said determining a subsequent path of the currently selected first path comprises:

determining whether the currently selected first path is directly connected to the target node of the current subtask, and in accordance with a determination that the currently selected first path is directly connected to the target node of the current subtask:

adding 1 to a value of an index value N of the first path downstream of the currently selected first path; or updating the index value N of the first path downstream of the currently selected first path to the sequence number S of a next subtask.

12. The path planning method according to claim 10, wherein said determining a subsequent path of the currently selected first path comprises:

determining each of downstream paths of the currently selected first path, wherein the downstream path is a path that is downstream of the currently selected first path and is directly connected to the currently selected first path;

comparing the available occupancy identifier of the currently selected first path with the initial occupancy identifier of each of the downstream paths, to determine the available occupancy identifier of each of the downstream paths;

calculating the weight value of each of the downstream paths; and adding the weight value of each of the downstream paths to the priority queue.

13. The path planning method according to claim 12, wherein said determining a subsequent path of the currently selected first path comprises:

determining whether each of the downstream paths is directly connected to the target node of the current subtask, and in accordance with a determination that one or more of the downstream paths is directly connected to the target node of the current subtask: setting the weight value of the one or more of the downstream paths directly connected to the target node of the current subtask to 0.

14. The path planning method according to claim 9, wherein the path planning method further comprises:

determining whether the priority queue comprises the data information, and in accordance with a determination that the priority queue comprises the data information:

returning to the step of selecting the first path with a minimum weight value from the priority queue; and in accordance with a determination that the priority queue does not comprise the data information, stop planning.

15. The path planning method according to claim 1, wherein when the occupancy identifier is the natural number, a smaller value of the natural number indicates an earlier execution sequence of the corresponding path; and when the occupancy identifier is the interval, a smaller value of a start point of the interval indicates an earlier execution sequence of the corresponding path.

16. The path planning method according to claim 1, wherein the method further comprises:

determining a predetermined occupancy identifier of each of the second paths based on the one or more second paths and the available occupancy identifier of each of the second paths, the predetermined occupancy identifier comprising the natural number, and the predetermined occupancy identifier being used to determine the execution sequence of the one or more second paths.

17. The path planning method according to claim 16, further comprising:

receiving current position information of the mobile apparatus performing the task;

determining the current predetermined occupancy identifier $A_{current}$ of the mobile apparatus based on the current position information;

acquiring a maximum length of a third path sent to the RCS, wherein the third path is selected from the one or more second paths;

sequentially selecting, starting from the current predetermined occupancy identifier $A_{current}$, the one or more second paths in ascending order of the predetermined occupancy identifiers, to generate the third path, until any one of the following conditions is met:

a cumulative length of the selected second paths reaches the maximum length;

no second path is available for selection; and sending the generated third path to the RCS.

18. The path planning method according to claim 17, wherein said sequentially selecting, starting from the current predetermined occupancy identifier $A_{current}$, the one or more second paths in ascending order of the predetermined occupancy identifiers, to generate the third path further comprises:

determining, for each to-be-executed second path, the predetermined occupancy identifier $A_i$ corresponding thereto; and comparing the $A_i$ with the current predetermined occupancy identifier $A_{other}$ of another mobile apparatus performing another task, and in accordance with a determination that $A_i<A_{other}$, determining a corresponding to-be-executed second path as the third path;

in accordance with a determination that $A_i \geq A_{other}$, determining whether the another mobile apparatus conflicts with the mobile apparatus performing the task in a range from $A_{other}$ to $A_i$, in accordance with a determination that the another mobile apparatus conflicts with the mobile apparatus performing the task, skipping the corresponding to-be-executed second path; and in accordance with a determination that the another mobile apparatus does not conflict with the mobile apparatus performing the task, determining the corresponding to-be-executed second path as the third path, and continuously determining whether a subsequent to-be-executed second path conflicts with a path of the another the mobile apparatus, until any one of the conditions is met.

19. The path planning method according to claim 18, wherein said acquiring a maximum length of a third path sent to the RCS comprises:

determining a minimum one of a first length and a second length, wherein the first length is equal to an upper path length limit value preset by a dispatch system, and the second length is a maximum feasible path length from a current position of the mobile apparatus.

20. A controller, configured to execute program instructions to implement the following steps:

receiving a task, and determining one or more first paths based on the task, wherein the first paths are paths on a map of the task;

determining an initial occupancy identifier of each of the first paths based on current occupancy identifiers of paths in an operating environment;

determining, based on the initial occupancy identifiers, one or more second paths for performing the task and an available occupancy identifier of each of the second paths, wherein each of the current occupancy identifiers, the initial occupancy identifiers, and the available occupancy identifiers comprises a natural number or an interval defined by the natural number, and each of the current occupancy identifiers, the initial occupancy identifiers, and the available occupancy identifiers are used to determine an execution sequence of a corresponding path; and sending the one or more second paths to a robot control system (RCS) for controlling a mobile apparatus to perform the task according to the one or more second paths.

* * * * *